US012812293B2

(12) United States Patent
Mathew et al.

(10) Patent No.: US 12,812,293 B2
(45) Date of Patent: Nov. 24, 2026

(54) ACOUSTIC LOUDSPEAKER DETECTION FOR MEDIA IDENTIFICATION

(71) Applicant: The Nielsen Company (US), LLC, New York, NY (US)

(72) Inventors: Justin Dan Mathew, Fort Lauderdale, FL (US); Douglas Brent Turnbow, Orem, UT (US); Timothy Scott Cooper, Tarpon Springs, FL (US); Meryem Berrada, Tampa, FL (US); Gavin Baker, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 93 days.

(21) Appl. No.: 18/956,357

(22) Filed: Nov. 22, 2024

(65) Prior Publication Data

US 2025/0193581 A1 Jun. 12, 2025

Related U.S. Application Data

(60) Provisional application No. 63/608,881, filed on Dec. 12, 2023.

(51) Int. Cl.
*H04R 1/32* (2006.01)
*G06F 3/16* (2006.01)
*H04R 3/00* (2006.01)

(52) U.S. Cl.
CPC ............... *H04R 1/323* (2013.01); *G06F 3/16* (2013.01); *H04R 3/005* (2013.01); *H04R 2203/12* (2013.01)

(58) Field of Classification Search
CPC .... H04R 1/323; H04R 3/005; H04R 2203/12; G06F 3/16
See application file for complete search history.

(56) References Cited

U.S. PATENT DOCUMENTS

| | | | | |
|---|---|---|---|---|
| 5,481,294 | A | 1/1996 | Thomas et al. | |
| 8,194,880 | B2 | 6/2012 | Avendano | |
| 9,069,065 | B1 | 6/2015 | Coley et al. | |
| 9,503,783 | B2 * | 11/2016 | Lee .................. | H04N 21/44213 |
| 9,560,446 | B1 | 1/2017 | Chang et al. | |

(Continued)

FOREIGN PATENT DOCUMENTS

| | | | |
|---|---|---|---|
| CA | 3145158 | A1 | 12/2020 |
| CN | 107271963 | A | 10/2017 |

(Continued)

OTHER PUBLICATIONS

Ahrens, Jens, "Ambisonic Encoding of Signals From Equatorial Microphone Arrays", Chalmers University of Technology, Sep. 18, 2022, 04 Pages.

(Continued)

*Primary Examiner* — Andrew Sniezek

(57) ABSTRACT

In one example, a method is described. The method includes receiving, via a microphone array, an audio signal; converting the audio signal to a digital signal; storing the digital signal in a buffer as audio data; performing spatial audio capture, using the stored audio data, to produce directional audio signals such that each signal now represents audio data from a respective direction; and determining, for each directional audio signal, whether a media sound from a loudspeaker is present.

20 Claims, 15 Drawing Sheets

(56) References Cited

U.S. PATENT DOCUMENTS

| | | | |
|---|---|---|---|
| 10,225,730 B2 | 3/2019 | Nielsen et al. | |
| 10,750,354 B2 | 8/2020 | Nielsen et al. | |
| 11,226,396 B2 | 1/2022 | Rafii | |
| 11,656,318 B2 | 5/2023 | Rafii | |
| 12,044,792 B2 | 7/2024 | Rafii | |
| 2005/0035897 A1 | 2/2005 | Perl et al. | |
| 2010/0053340 A1 | 3/2010 | Ikeda et al. | |
| 2012/0076316 A1 | 3/2012 | Zhu et al. | |
| 2012/0128175 A1 | 5/2012 | Visser et al. | |
| 2012/0327746 A1 | 12/2012 | Velusamy | |
| 2014/0286497 A1 | 9/2014 | Thyssen et al. | |
| 2015/0009072 A1 | 1/2015 | Nijsure | |
| 2016/0165341 A1 | 6/2016 | Benattar | |
| 2017/0094223 A1 | 3/2017 | Burenius | |
| 2017/0195793 A1 | 7/2017 | Vilermo et al. | |
| 2017/0374546 A1 | 12/2017 | Nielsen et al. | |
| 2019/0261162 A1 | 8/2019 | Nielsen et al. | |
| 2019/0372541 A1* | 12/2019 | Friant | G01S 5/18 |
| 2020/0408874 A1 | 12/2020 | Rafii | |
| 2021/0037376 A1 | 2/2021 | Nielsen et al. | |
| 2022/0091223 A1 | 3/2022 | Rafii | |
| 2023/0067774 A1 | 3/2023 | Nishimoto | |
| 2023/0243918 A1 | 8/2023 | Rafii | |
| 2024/0329186 A1 | 10/2024 | Rafii | |

FOREIGN PATENT DOCUMENTS

| | | | |
|---|---|---|---|
| CN | 108896962 | A | 11/2018 |
| CN | 114731468 | A | 7/2022 |
| EP | 3261274 | A1 | 12/2017 |
| EP | 3699627 | A1 | 8/2020 |
| EP | 3910825 | A1 | 11/2021 |
| EP | 3991442 | A1 | 5/2022 |
| KR | 20150025930 | A | 3/2015 |
| WO | 2019077856 | A1 | 4/2019 |
| WO | 2020263649 | A1 | 12/2020 |
| WO | 2024151946 | A1 | 7/2024 |

OTHER PUBLICATIONS

Ahrens, Jens, "Ambisonic Encoding of Signals From Spherical Microphone Arrays", Chalmers University of Technology, Sep. 18, 2022, 04 Pages.

Braun et al., "Low Complexity Online Convolutional Beamforming", 2021 IEEE Workshop on Applications of Signal Processing to Audio and Acoustics (WASPAA), 2021, 05 Pages.

Braun et al., "An informed spatial filter for dereverberation in the spherical harmonic domain", 2013 IEEE International Conference on Acoustics, Speech and Signal Processing, 2013, pp. 669-673.

Broeck et al., "Time-domain generalized cross correlation phase transform sound source localization for small microphone arrays", 2012 5th European DSP Education and Research Conference (EDERC), Sep. 2012, 06 Pages.

Kassir et al., "A Review of the State of the Art and Future Challenges of Deep Learning-Based Beamforming", IEEE Access, vol. 10, Aug. 1, 2022, pp. 80869-80882.

Maranda, Brian, "Efficient digital beamforming in the frequency domain", The Journal of the Acoustical Society of America, vol. 86, Issue 5, Nov. 1989, pp. 1813-1819.

Morata et al., "Extension of Traditional Beamforming Methods to the Continuous-Scan Paradigm", University of California, Jan. 3, 2022, 29 Pages.

Nakatani et al., "Blind and Neural Network-Guided Convolutional Beamformer for Joint Denoising, Dereverberation, and Source Separation", ICASSP 2021—2021 IEEE International Conference on Acoustics, Speech and Signal Processing (ICASSP), 2021, pp. 6129-6133.

Pessentheiner, Hannes, "Beamforming Using Uniform Circular Arrays for Distant Speech Recognition in Reverberant Environment and Double-Talk Scenarios", Graz University of Technology, Feb. 28, 2012, 112 Pages.

Rascon, Caleb, "A Corpus-Based Evaluation of Beamforming Techniques and Phase-Based Frequency Masking", Sensors, vol. 21, Issue 15, Jul. 23, 2021, 19 Pages.

Wang et al., "A Low-complexity Minimum-variance Beamformer Based on Orthogonal Decomposition of the Compounded Subspace", Ultrasonic Imaging, vol. 43, Issue 1, Dec. 23, 2020, pp. 3-18.

Schorkhuber et al., "Binaural Rendering of Ambisonic Signals via Magnitude Least Squares," DAGA 2018, Munich, Mar. 2018, pp. 339-342.

International Searching Authority, "International Search Report," in Connection with International Patent Application No. PCT/US2020/038114, issued on Sep. 17, 2020, 3 pages.

International Searching Authority, Written Opinion, in connection with International Patent Application No. PCT/US2020/038114, issued on Sep. 17, 2020 6 pages.

Peters et al, "Beamforming using a spherical microphone array based on legacy microphone Characteristics," [http://www.antarestech.com/products/amm.shtml], Center for New Music and Audio Technologies (CNMAT), UC Berkeley, International Computer Science Institute (ICSI), 2011, 7 pages.

United States Patent and Trademark Office, Non-Final office action, issued in connection with U.S. Appl. No. 17/541,020, mailed on Sep. 30, 2022, 4 pages.

United States Patent and Trademark Office, Non-Final office action, issued in connection with U.S. Appl. No. 18/298,178, mailed on Nov. 3, 2023, 4 pages.

United States Patent and Trademark Office, Non-Final office action, issued in connection with U.S. Appl. No. 18/740,270, mailed on Jan. 17, 2025, 4 pages.

* cited by examiner

ACOUSTIC LOUDSPEAKER DETECTION FOR MEDIA IDENTIFICATION

CROSS-REFERENCE TO RELATED APPLICATION(S)

This disclosure claims priority to U.S. Provisional Pat. App. No. 63/608,881, filed Dec. 12, 2023, which is hereby incorporated herein by reference in its entirety.

BACKGROUND

The present disclosure relates in general to detecting sounds originating from a loudspeaker of a media device, and in particular, to distinguishing sounds originating from a loudspeaker from sounds generated by other objects and/or person(s) to identify media content from the loudspeaker.

USAGE AND TERMINOLOGY

In this disclosure, unless otherwise specified and/or unless the particular context clearly dictates otherwise, the terms “a” or “an” mean at least one, and the term “the” means the at least one.

SUMMARY

In one aspect a method is described. The method includes receiving, via a microphone array, an audio signal; converting the audio signal to a digital signal; storing the digital signal in a buffer as audio data; performing spatial audio capture, using the stored audio data, to produce directional audio signals such that each signal now represents audio data from a respective direction; and determining, for each directional audio signal, whether a media sound from a loudspeaker is present.

In another aspect, a non-transitory computer-readable storage medium, having stored thereon program instructions that, upon execution by a processor, cause performance of a set of operations is described. The set of operations include receiving, via a microphone array, an audio signal; converting the audio signal to a digital signal; storing the digital signal in a buffer as audio data; performing spatial audio capture, using the stored audio data, to produce directional audio signals such that each signal now represents audio data from a respective direction; and determining, for each directional audio signal, whether a media sound from a loudspeaker is present.

In another aspect, a computing system is described. The computing system includes a processor and a non-transitory computer-readable storage medium, having stored thereon program instructions that, upon execution by the processor, cause performance of a set of operations. The set of operations include receiving, via a microphone array, an audio signal; converting the audio signal to a digital signal; storing the digital signal in a buffer as audio data; performing spatial audio capture, using the stored audio data, to produce directional audio signals such that each signal now represents audio data from a respective direction; and determining, for each directional audio signal, whether a media sound from a loudspeaker is present.

DETAILED DESCRIPTION

I. Overview

Figure 1:
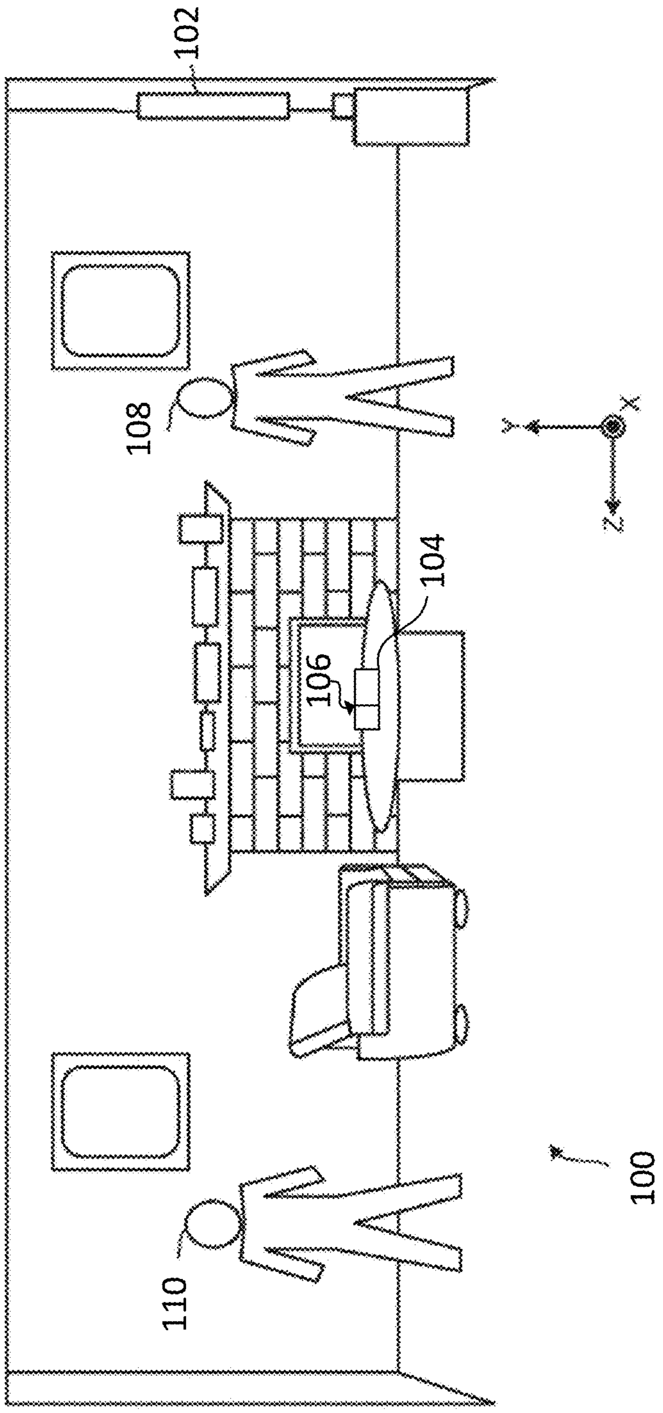
FIG. 1 is a diagrammatic illustration of an example media exposure environment including an example audience measurement device disclosed herein in accordance with one or more aspects.

Media providers and/or other entities such as, for example, advertising companies and broadcast networks, are often interested in the viewing, listening, and/or media behavior of audience members and/or the public in general. To monitor these behaviors, an audience measurement entity (“AME”) may enlist panelists (e.g., persons agreeing to be monitored) to cooperate in an audience measurement panel. The media usage and/or exposure habits of these panelists, as well as, demographic data about the panelists is collected and used to statistically determine the size and demographics of a larger audience of interest. One way to monitor these behaviors is using an audience measurement device such as a meter within the home of the panelist. When a panelist enlists, the AME may send a technician to the panelist’s home to set up the meter to detect audio signals from a media device such as from a loudspeaker of a television. These technicians may undergo training on how to properly install the meter to ensure that the meter receives a strong signal from the media device. The strong signal is useful for ensuring that the AME receives accurate and consistent data to properly credit media exposure.

However, in some instances, the AME may mail the meter to the panelist for the panelist to install. Having a panelist install the meter may present a number of challenges. For example, while the technician knows where in a media exposure environment to place the meter in order to receive the best audio signals, a panelist may select a less than desirable location for the meter within the media exposure environment. This less-desirable location may be further away from the loudspeakers of the media device and/or in a position that picks up more background noise. The ability of the meter to receive a strong and accurate signal is helpful for producing accurate media ratings, especially if the meter is placed in the less-desirable location.

Moreover, a panelist's home may present challenges to the meters that monitor media devices. For example, a panelist home often includes multiple noise sources located within the home such as a dog barking, a panelist talking, or an air conditioner running. Some of these noise sources may even be louder than the audio signals from the media device. The meter that is located in the media exposure environment may be configured to (1) detect any audio signals, (2) then detect if media is being presented in the audio signals, and (3) then to credit the media as having been presented. In order to generate reliable ratings, it is useful for meters to be able to distinguish sounds in the media exposure environment that are related to media content from the sounds in the media exposure environment that are not media. Therefore, for the meter to produce accurate media ratings, the meter needs to detect sound from loudspeakers of a media device, even when the sound from the loudspeakers is not the loudest sound in the room. The examples described herein therefore detect media regardless of whether the audio signal corresponding to the media is the loudest sound in the media exposure environment.

The examples described below recognize that it may be desirable to have methods and systems that more efficiently detect media sounds in audio signals. In particular, the aspects described below use spatial audio capture to obtain multi-directional audio signals, which includes a plurality of directional audio signals, and determine if any of the directional audio signals include media sounds that are in need of media identification. One example of creating multi-directional audio signals includes using multi-directional beamforming. Another example of generating multi-directional audio signals includes using ambisonics.

Several examples are described herein for identifying features of a directional audio signal that contribute to a likelihood that the directional audio signal corresponds to media, for example, determining that the source of the audio signal is stationary or determining that the audio signal contains a distortion relating to passing through a loudspeaker. Therefore, the operations and systems provide an improvement to signal detection and media identification by creating a more robust meter that points the signal to media sound steered towards the media device.

FIG. 1 is an illustration of an example media exposure environment 100 which includes a media device 102 and a meter 104 for collecting audience measurement data. The meter 104 includes a microphone array 106 for detecting audio signals. The media exposure environment 100 further includes a first person 108 located near the media device 102, and a second person 110 located further from the media device 102 within the media exposure environment 100 in comparison to the first person 108. In the illustrated example of FIG. 1, the media exposure environment 100 is a room of a household (e.g., a room in a home of a panelist of an AME) that has been statistically selected to develop media ratings data for population(s)/demographic(s) of interest. In the illustrated example, the media device 102 is a television, and the meter 104 is located at a position away from the media device 102. In the illustrated example, one or more persons (such as the first person 108) of the household have registered with an audience measurement entity (e.g., by agreeing to be a panelist) and have provided demographic information to the audience measurement entity enable associating demographics with viewing activities (e.g., media exposure).

In one or more aspects, the media exposure environment 100 is a different room in the household than that illustrated by FIG. 1 such as a kitchen or bedroom. In some aspects, the media exposure environment 100 is a vehicle such as a car. In several aspects, the media exposure environment 100 includes a plurality of rooms within a household or business, so long as audio sounds from a room of the plurality of rooms is being reliably detected by the meter 104. In some aspects, the media exposure environment 100 may be in a room of a non-statistically selected home, a theater, a tavern, a retail location, an arena, or the like.

In several aspects, the media device 102 is a device other than a television such as another information presentation device. An information presentation may include a radio, a video game console, a tablet, a laptop, a cellular telephone, a computer, one or more loudspeakers, and the like. In some aspects, the media device 102 includes a television and one or more loudspeakers operably associated with the television. In one or more aspects, the one or more loudspeakers, such as external surround-sound speakers, are moved within the media exposure environment 100. In some aspects, the one or more loudspeakers are built into the television.

In at least one aspect, the meter 104 is an audience measurement device provided to the first person 108 and/or second person 110 for collecting and/or analyzing the data from the media device 102. The meter 104, in some aspects, is coupled directly to the media device 102. In other aspects, a universal serial bus (USB) dongle is coupled to the media device 102, and the USB dongle wirelessly couples the media device 102 to the meter 104. In some aspects, the meter 104 is moveable around the media exposure environment 100 and/or may be positioned in a number of locations around the media exposure environment 100 to detect audio signals from the media device 102.

In one or more aspects, the microphone array 106 is two or more transducers or microphones used for sound capture. In one or more examples, the microphone array 106 is a set of two or more microphones. In some aspects, the microphone array 106 is a set of six, seven, eight, or more microphones. Each microphone of the microphone array 106 may be placed and/or oriented in various configurations. In some aspects, the microphone array 106 is a circular array. The microphone array 106, in some aspects, is a set of digital microphones. In other aspects, the microphone array 106, are a set of analog microphones.

In one or more aspects, the first person 108 is a panelist. In other aspects, the first person 108 is not associated with the panel and is a guest to the media exposure environment 100. In some aspects, the first person 108 is omitted from the media exposure environment 100. In one or more aspects, the second person 110 is a panelist. In other aspects, the second person 110 is not associated with the panel and is a guest of the first person 108 to the media exposure environment 100. In some aspects, the first person 108 is omitted from the media exposure environment 100. In other aspects, additional persons are located within the media exposure environment 100.

In operation, the meter 104 is installed in the media exposure environment 100 by a panelist such as the first person 108, or by a technician. The meter 104 is designed to receive audio using the microphone array 106. The panelist such as the first person 108 may decide to watch a sports game and turn on the media device 102. The meter 104 may begin to receive the audio from the sports game. However, within the media exposure environment 100, the second person 110 may decide to yell when her sports team begins a losing streak. The microphone array 106 of the meter 104 may begin detecting audio signals from the second person 110, as well as, the audio signal from the media device 102. The meter 104 determines which audio signals are from the media device 102, rather than from the second person 110, and transmits those audio signals (or data associated with those audio signals) for media identification. The meter 104 discards the audio signals that are not associated with the media device 102.

In one or more aspects, a person such as the first person 108 switches the sound output of the media device 102 from the internal speakers of the media device 102 to one or more external loudspeakers operationally coupled to the media device 102, and the meter 104 is configured to determine if the audio signals from the one or more external loudspeakers are media sounds. Therefore, the position and orientation of the meter 104 with respect to the sound output of the media device 102 may change. In one or more aspects, a plurality of media devices 102 are played within the media environment 100, and the meter 104 is configured to determine the location of each media device 102 via spatial audio capture. For example, a television may be turned on and playing a program as a radio is turned on and playing a station. In various aspects, the television and the radio may be simultaneously playing, and the meter 104 is configured to determine the location of both the television and the radio. The meter 104 is also configured to identify the media of both the television and the radio via watermark decoding and/or signature generation and credit the respective programs. In some aspects, the meter 104 and/or the media device 102 is moved within the media exposure environment 100. In one or more aspects, the meter 104 determines, via spatial audio capture, the location of audio signals containing media sounds after the meter 104 is moved, after the media device 102 is repositioned, when the media device 102 switches sound outputs, and/or the like.

In some aspects, the media device 102 is turned off. In one or more aspects, a plurality of persons is speaking, singing, or otherwise making noise that is being detected by the microphone array 106. In some aspects, other noises are being detected by the meter 104 such as noises from a loud dishwasher or other live sounds are being picked up by the microphone array 106.

II. System Architecture

Figure 2:
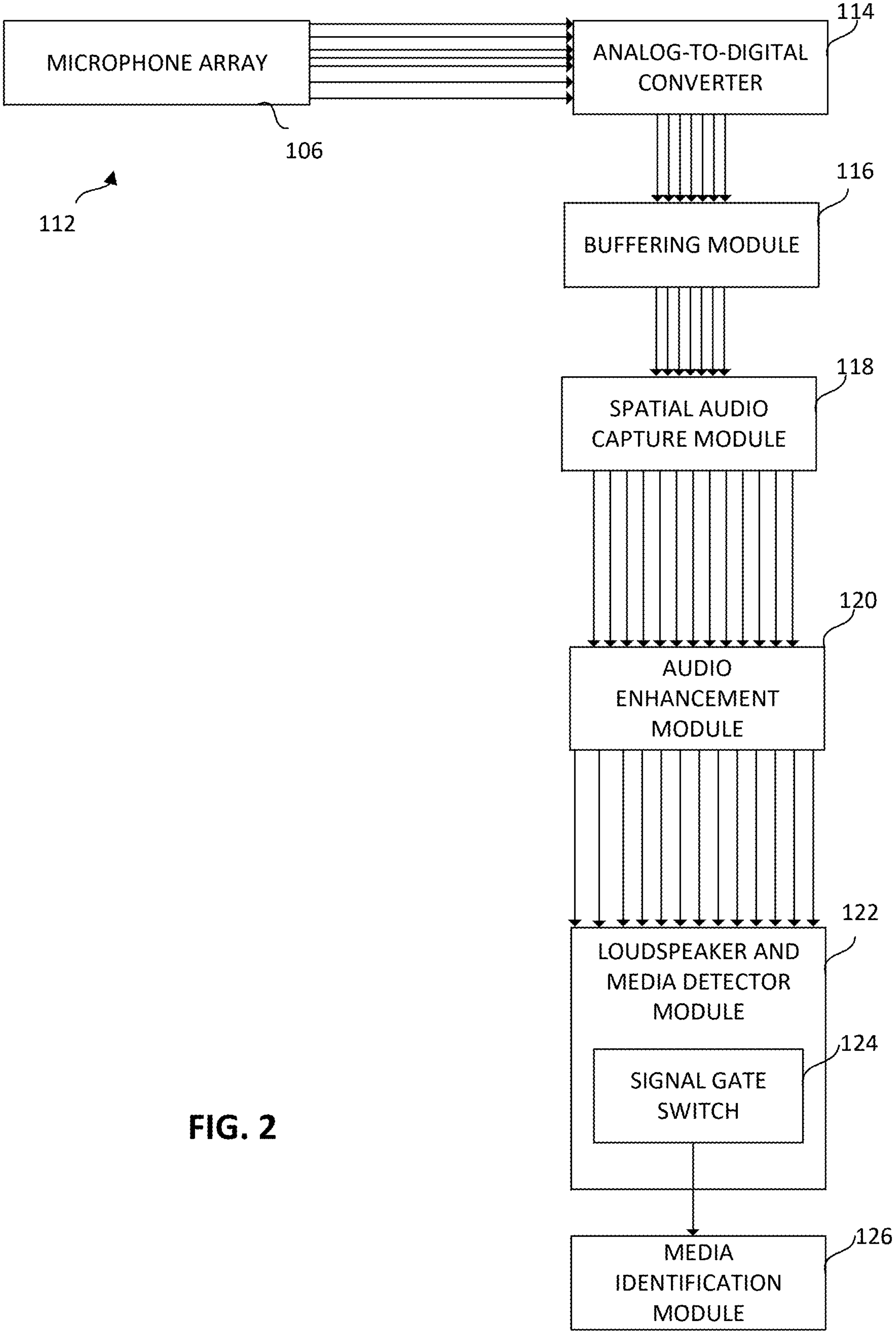
FIG. 2 is a simplified block diagram of a portion of the example audience measurement device of FIG. 1 in which various described operations can be implemented in accordance with one or more aspects.

Referring to FIG. 2, with continuing reference to FIG. 1, a sub-system of the meter 104 is generally referred to by reference numeral 112. The sub-system 112 includes the microphone array 106, an analog-to-digital converter 114 ("ADC"), a buffering module 116, a spatial audio capture module 118, an audio enhancement module 120, and a loudspeaker and media detector module 122. The loudspeaker and media detector module 122 includes a signal gate switch 124. The sub-system 112 also includes a media identification module 126.

In various aspects, at least a portion of the sub-system of the meter 104 is a computing system as described herein.

In several aspects, the number of microphones in the microphone array 106 are represented by the arrows extending from the microphone array to the ADC 114. In some aspects, each microphone sends an audio signal to the ADC 114, which is represented by an arrow. In some aspects, a different number of microphones are in the microphone array than depicted in the illustration of FIG. 2.

In some aspects, the ADC 114 is replaced with a Pulse Density Modulation into a Pulse Code Modulation ("PDM-PCM") Converter Module when the microphone array 106 includes digital microphones. Both the PDM-PCM Converter Module and the ADC 114 may have a variable sampling frequency and digital precision. In one or more aspects, the ADC 114 is in communication with and/or operably coupled to the microphone array 106 and/or the buffering module 116. In some aspects, each audio signal from the ADC 114, which is represented by an arrow, corresponds to a different microphone in the microphone array 106.

In one or more aspects, the buffering module 116 is in communication with and/or operably coupled to the ADC 114 and/or the spatial audio capture module 118. In some aspects, each audio signal from the buffering module 116, which is represented by an arrow, corresponds to a different microphone in the microphone array 106. In some aspects, the buffering module includes a buffer.

In some instances, the spatial audio capture module 118 may include and/or be in communication with a database or data store that stores a set of predetermined directions and/or stores a set of time delays that correspond to a respective direction of the set of predetermined directions. In one or more aspects, the spatial audio capture module 118 is in communication with and/or operably coupled to the buffering module 116 and/or the audio enhancement module 120. In some aspects, each audio signal from the spatial audio capture module 118, which is represented by an arrow, corresponds to a different direction rather than an individual microphone of the microphone array 106. The number of directions may be different than what is shown in FIG. 2. In various aspects, the number of directions is six.

In various aspects, the audio enhancement module 120 may include one or more sets of audio enhancement submodules such as, but not limited to, filtering, noise reduction techniques, de-reverberation techniques, weighting, automatic gain control ("AGC"), and the like. In one or more aspects, the audio enhancement module 120 is in communication with and/or operably coupled to the spatial audio capture module 118 and/or loudspeaker and media detector module 122. In some aspects, each audio signal from the spatial audio capture module 118, which is represented by an arrow, corresponds to a different direction rather than an individual microphone of the microphone array 106.

In some instances, the signal gate switch 124 is a separate component from the loudspeaker and media detector module 122. The signal gate switch 124 may be a software module. In various aspects, the signal gate switch 124 is in communication with the loudspeaker and media detector module 122 and/or the media identification module 126. In some aspects, the loudspeaker and media detector module 122 is in communication with the media identification module 126. In various aspects, the loudspeaker and media detector module 122 includes a memory.

In various aspects, the media identification module 126 includes a watermark decoder. For example, in several instances, digital broadcasters enable identification of digital broadcast programs by inserting or embedding digital program identification and/or other data (e.g., watermark data, such as Critical Band Encoding Technology ("CBET")) in a video and/or audio bit stream. In some examples, the inserted or embedded digital data is commonly referred to as audience measurement data or content identification data, which may include signal identification codes (i.e., digital codes that are uniquely associated with respective audio/video content portions or programs), date information, time information, consumer identification information, etc. Therefore, in various aspects, when the program associated with the video/audio is transmitted and played on the media device 102, the program includes the embedded watermark, which is inaudible to humans (such as the first person 108) but decodable by the meter 104 to determine a source of the audio/video being played by the media device 102. In several aspects, the watermark decoder of the media identification module 126 decodes the embedded watermark. The meter 104 may be configured to transmit detected watermarks to a server.

In one or more instances, the media identification module 126 includes a signature generator. For example, in one or more aspects, the sub-system 112 extracts audio information associated with a program currently being broadcast and/or viewed by the media device 102 and processes that extracted information to generate audio signatures. In several aspects, the processing of the extracted information to generate audio signatures occurs at the media identification module 126. The audio signatures may include digital sequences or codes, (such as, but not limited to, StreamFP™), that, at a given instant of time, are substantially unique to each portion of audio content or program. In several examples, the audio information detected by the microphone array 106 are audio snippets with durations of six seconds or shorter. In other instances, the audio information may be 6, 8, or 10 second audio clips or the like. In some instances, the media identification module 126 matches a generated audio signature against reference signatures of a reference database. The reference database may be stored on the meter 104. Or the reference database may be stored in a server. With this approach, the media identification module 126 obtains media identification information corresponding to an audio signature, and transmits the media identification information to a server. In other instances, the media identification module 126 transmits generated audio signatures to a server.

Figure 3A:
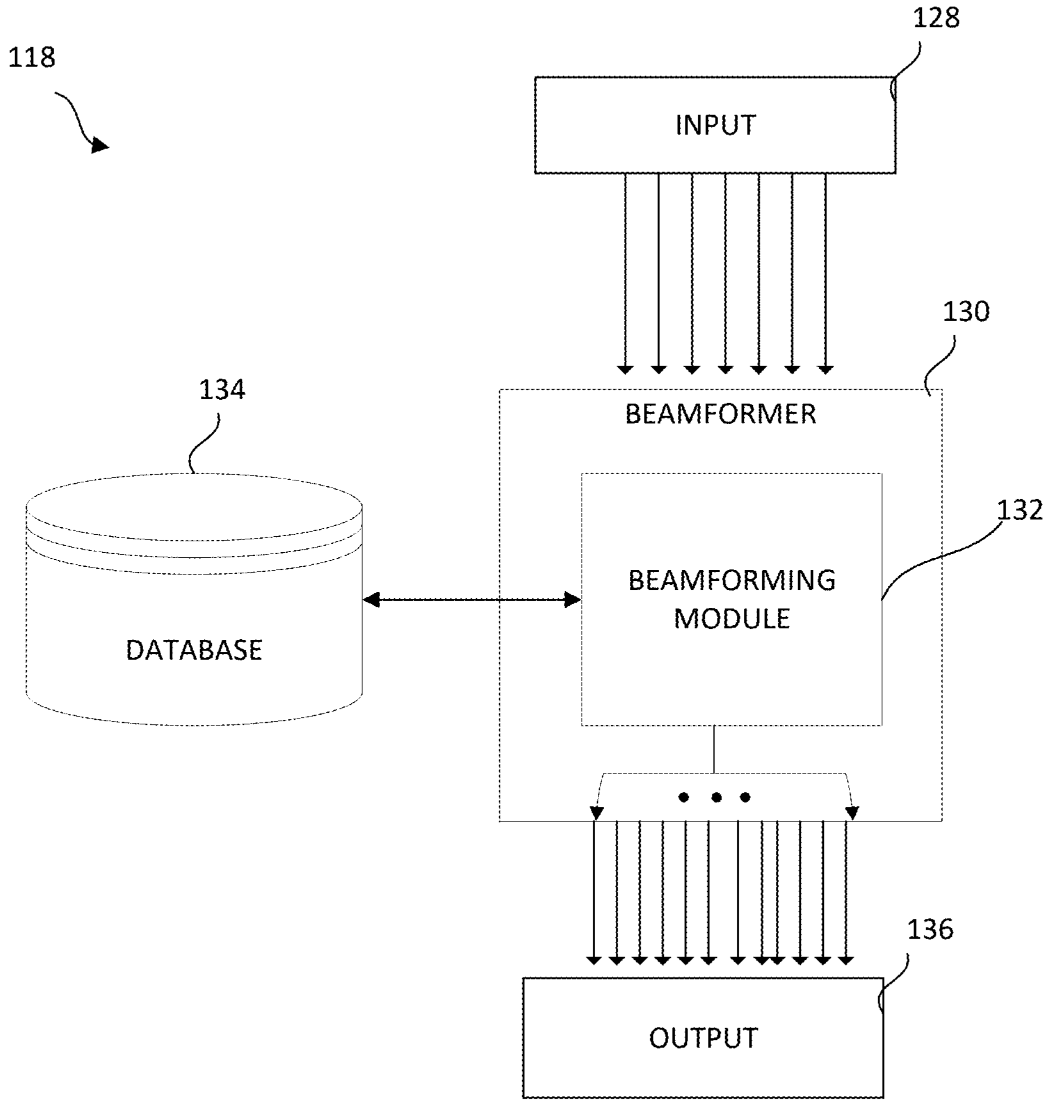
FIG. 3A is a simplified block diagram of a spatial audio capture module in accordance with one or more aspects.

Referring to FIG. 3A, with continuing reference to FIG. 2, FIG. 3A is an illustration of the spatial audio capture module 118, in accordance with one or more instances. The spatial audio capture module 118 receives an input 128 that is sent to a beamformer 130. The input 128 may include audio data stored in the buffering module 116. The beamformer 130 includes a beamforming module 132. The beamforming module 132 is in communication with and/or operably coupled to the database 134. The beamforming module 132 generates an output 136. The output 136 are multi-directional audio signals.

In some aspects, the beamformer 130 includes the beamforming module 132 and the database 134. In some aspects, the beamformer 130 includes memory. In one or more aspects, a list of directions is stored in the memory or database 134. The list of directions may include only 6 directions, in some instances. In other instances, a different number of directions is stored. In some aspects, the list of directions is based on the configuration of the microphone array 106 and/or the configurations of the microphones within the microphone array 106. In various instances, the beamforming module 132 includes a delay and sum component, where the delay and sum component delays all the channels but a microphone ("mic") reference channel and adds them to a mic reference channel to produce a mono audio data representing sound from a direction of a predetermined set of directions (the list of directions). In some aspects, the beamforming module 132 stores a mono audio data representing sound from the direction. In one or more instances, the mono audio data is stored in a multi-beam matrix. In some aspects, the beamforming module 132 determines whether a mono audio data has been stored for all directions in the list of directions and if not, determines the mono audio data for the missing direction and stores it. In some instances, the beamforming module 132 includes a database or other memory to store the multi-beam matrix, separate from the database 134. In some aspects, the beamformer 130 includes a weighting module. For example, the weighting module may take an actual delay of a microphone in the microphone array 106 and either weight larger delays to deemphasize lower frequency or weight smaller delays to deemphasize higher frequency or microphones closer to the mic reference channel.

In various aspects, the database 134 is one or more databases that are in communication with the beamformer 130 and/or the beamforming module 132. The database 134 may store a list of the predetermined directions, a plurality of mic configurations, and a mic reference channel. The mic reference channel may, in some instances, refer to a specific channel of a plurality of channels in the input 128. The mic reference channel remains unchanged in some instances.

Figure 3B:
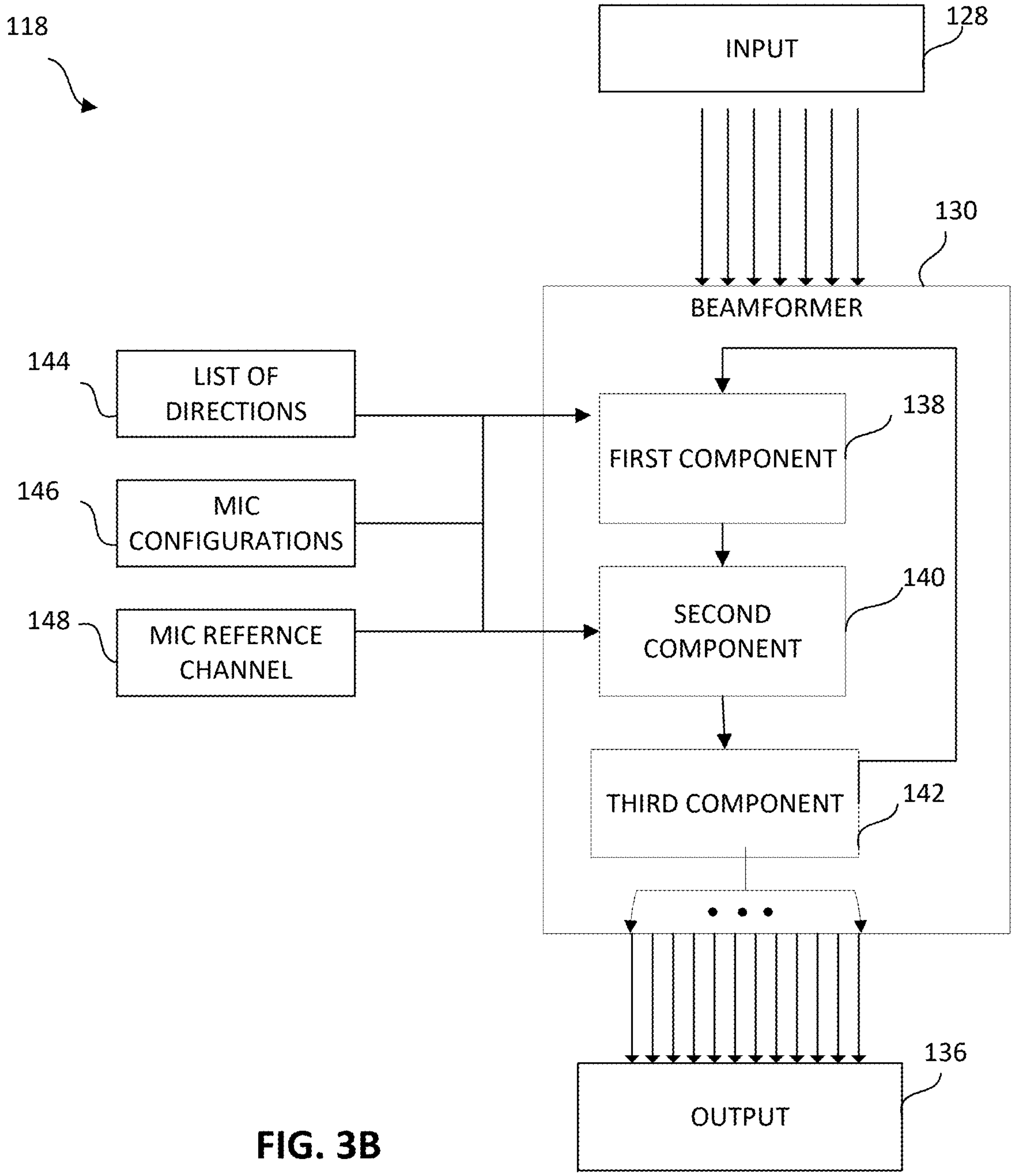
FIG. 3B is another simplified block diagram of a spatial audio capture module in accordance with one or more aspects.

Referring to FIG. 3B, with continuing reference to FIG. 2, FIG. 3B is another illustration of the spatial audio capture module 118, in accordance with one or more instances. The spatial audio capture module 118 includes the input 128 that is sent to the beamformer 130. The beamformer 130 includes a first component 138, a second component 140, and a third component 142 in order to beamform the input 128. The second component 140 is in communication with the first component 138 and/or operably coupled to the first component 138. The third component 142 is in communication with and/or operably coupled to the first component 138 and the second component 140. The spatial audio capture module 118 also includes a list of directions 144, mic configurations 146, and a mic reference channel 148. The mic reference channel 148 refers to a specific channel of a plurality of channels in the input 128 that remains unchanged during beamforming. The spatial audio capture module 118 further includes the output 136 sent from the beamformer 130. The output 136 are multi-directional audio signals, which include a plurality of directional audio signals corresponding to different, respective directions.

In various aspects, the first component 138 is a time-delay computer that computes time-delay for a direction from the list of directions. The time-delay computer may use a mic configuration from the mic configurations and the mic reference channel to compute time delay for the direction. In some aspects, the first component 138 is omitted and the computed time-delays are stored in a memory in communication with the beamformer 130.

In some instances, the second component 140 receives the computed time-delay and the mic reference channel from the first component 138. The second component 140, in some instances, is a sum-and-delay component that delays all the channels excluding the mic reference channel and adds these channels to the mic reference channel to generate a mono audio data representing sound from the direction. The second component 140, in some instances, generates a mono audio data for a plurality of directions from the list of directions 144. In several aspects, the second component 140 generates a mono audio data for every direction in the list of directions 144.

In one or more aspects, the third component 142 is a memory that stores the mono audio data from the second component 140. The mono audio data may be stored in a multi-beam matrix in the third component 142. In some instances, the third component 142 is a data store, database, or other memory to store the mono audio data.

In some aspects, a fourth component is included in the beamformer 130 for weighting.

In some instances, the list of directions 144 is one or more predetermined directions. In various aspects, the list of directions 144 is a stored set of directions which are stored in a database and/or memory. The list of directions 144, in various aspects, includes six directions. In other instances, the list of directions 144 includes two, four, eight, or more directions. In some aspects, the list of directions 144 is a list of directions with respect to the microphone array 106. In one or more instances, the list of directions is a list of directions with respect to the meter 104.

In several aspects, the mic configurations 146 is a plurality of stored configurations of the microphone array 106. In some aspects, only one mic configuration is stored in the mic configurations 146. In one or more instances, the mic configurations are stored. In some aspects, the mic configurations 146 is stored in the same database as the list of directions 144. In some instances, the mic configurations 146 includes the mic configurations of each microphone in the microphone array 106.

In various instances, the mic reference channel 148 is a specific channel in the input 128 (e.g., the buffered audio data). In some instances, the mic reference channel 148 is stored in a database. In several aspects, the mic reference channel 148 is stored in the same database as the list of directions 144.

With continuing reference to FIGS. 3A-3B, in various aspects, the input 128 is one or more channels of buffered audio data. In several instances, the output 136 is one or more channels of beamformed audio data, where each channel represents audio data from a direction of a predetermined set of directions (such as from the list of directions 144). In some aspects, the number of channels in the input 128 varies from the number of channels in the output 136. In several instances, the number of channels in the input 128 is less than the number of channels in the output 136. In one or more aspects, the output 136 is a plurality of audio signals. In some aspects, the audio signal of the plurality of audio signals no longer represents a single, respective microphone of the microphone array 106, but instead represents a single direction (after beamforming). The number of channels in FIGS. 3A-3B are examples and the number of channels of the input 128 and/or the output 136 may vary from the illustrations.

Figure 3C:
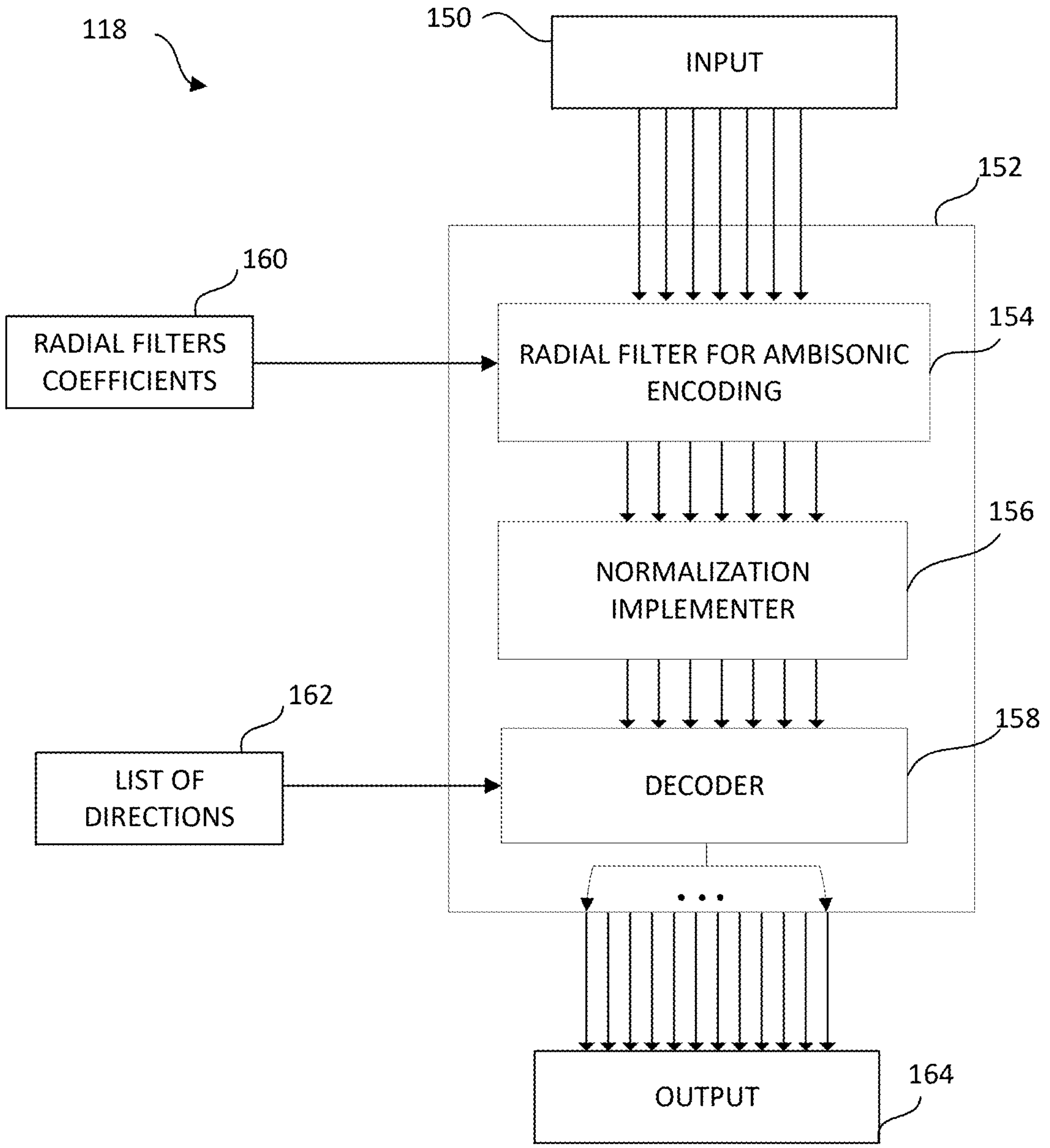
FIG. 3C is yet another simplified block diagram of a spatial audio capture module in accordance with one or more aspects.

Referring to FIG. 3C, with continuing reference to FIG. 2, FIG. 3C is yet another illustration of the spatial audio capture module 118, in accordance with one or more instances. The spatial audio capture module 118 includes an input 150 that is sent to an ambisonic spatial capture generator 152. The ambisonic spatial capture generator 152 includes a radial filter for ambisonic encoding 154, a normalization implementer 156, and a decoder 158. The spatial audio capture module 118 further includes radial filters coefficients 160, a list of directions 162, and an output 164. The radial filter coefficients 160 include one or more parameters that are pre-generated. The radial filter for ambisonic encoding 154 is in communication with and/or operably coupled to the normalization implementer 156. The normalization implementer 156 is in communication with and/or operably coupled to the decoder 158.

In one or more aspects, the input 150 is the same input as the input 128. In one or more aspects, the output 164 is the same output as the output 136. In some aspects, the output 164 is different from the output 136, as ambisonics generates spherical capture, which may help with phasing issues, occasionally seen in multi-directional beamforming.

In some aspects, the radial filters coefficients 160 are stored in a database accessible by the ambisonic spatial capture generator 152. In one or more aspects, the radial filters coefficients 160 are stored in a database accessible by the radial filter for ambisonic encoding 154. In one or more aspects, only a single radial filter coefficient of the radial filters coefficients 160 is selected and used for ambisonic encoding. In other aspects, a plurality of radial filters coefficients of the radial filters coefficients 160 are selected and used for ambisonic encoding. In one or more instances, the radial filters coefficients 160 are pre-determined coefficients based on the directionality of the microphones in the microphone array 106. In some aspects, the directionality of the microphones of the microphone array 106 are determined and then using spherical harmonics an audio signal of the input 150 is converted to a particular direction based on the radial filters coefficients 160.

In some aspects, the list of directions 162 are stored in a database and/or memory accessible by the ambisonic spatial capture generator 152. In one or more aspects, the list of directions 162 are stored in a database accessible by the decoder 158. In one or more aspects, the list of direction 162 is stored in the same database or similar data store as the radial filters coefficients 160. In some aspects, the list of directions 162 corresponds to a combination of spherical harmonic transforms of varying order, where a $0^{th}$ order is a sphere, a $1^{st}$ order is a sphere divided in half on two axes, and so on. The list of directions 162 includes the highest order that is possible to represent using the microphone array 106.

Figure 4:
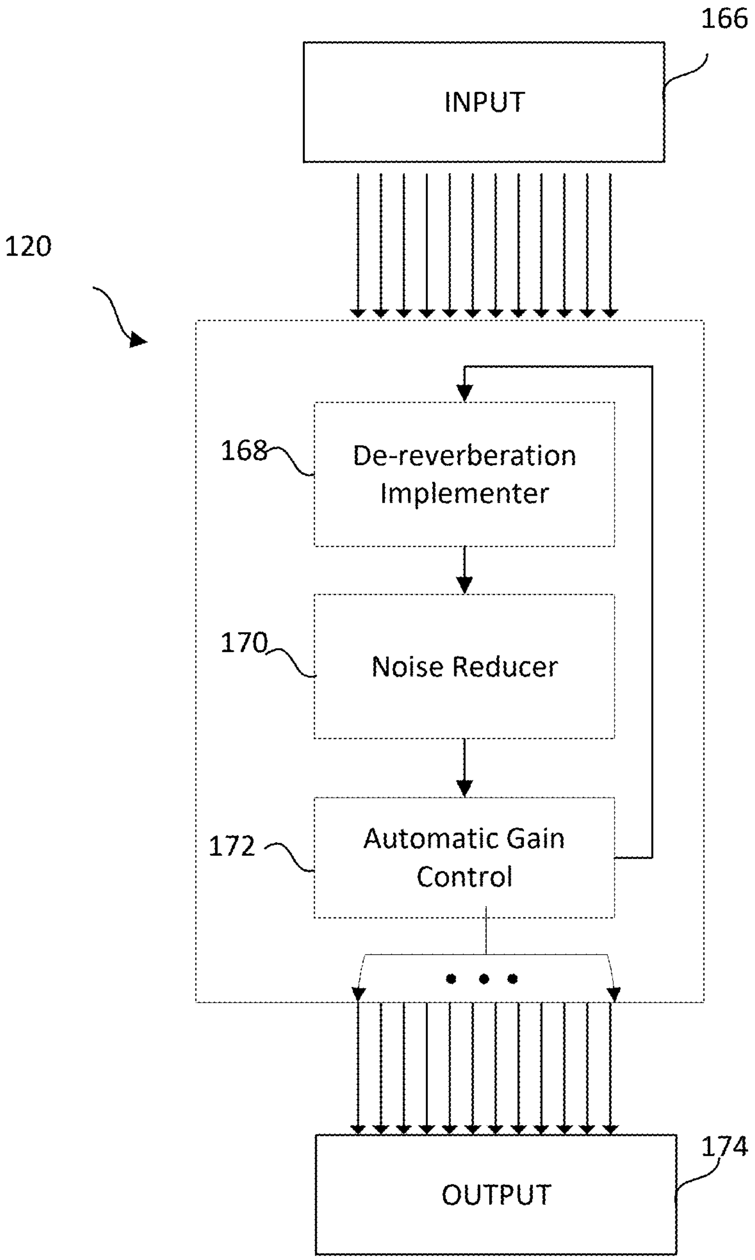
FIG. 4 is a simplified block diagram of an audio enhancement module in accordance with one or more aspects.

Referring to FIG. 4, with continuing reference to FIG. 2, FIG. 4 is an illustration of the audio enhancement module 120, in accordance with one or more instances. The audio enhancement module 120 receives an input 166. The audio enhancement module 120 includes a de-reverberation implementer 168, a noise reducer 170, and an automatic gain control ("AGC") 172. The audio enhancement module 120 generates an output 174. The de-reverberation implementer 168 is in communication with and/or operably coupled to the noise reducer 170. The noise reducer 170 is in communication with and/or operably coupled to the AGC 172. The AGC 172 is in communication with and/or operably coupled to the de-reverberation implementer 168 and the output 174. The output 174 are enhanced multi-directional audio signals.

In various aspects, the input 166 may be the same as the output 164. In other aspects, the input 166 may be the same as the output 136.

In one or more aspects, the input 166 is fed first into the de-reverberation implementer 168. In various aspects, the de-reverberation implementer 168 uses adaptive filtering. In some aspects, the filtering used by the de-reverberation implementer 168 depends on the direction. In various aspects, the filtering is based on the direction-of-arrival of the sound and an interference power spectral density matrix. In other aspects, the filtering is based on a neural network. In one or more aspects, the de-reverberation implementer 168 uses neural networks to implement removing reverberations of the multi-directional audio signals of the input 166. In various aspects, the neural network is based at least in part on source power spectra estimation in order to determine the source of the audio signal (e.g., loudspeaker of the media device 102) without prior information on the location of the source. In some aspects, the de-reverberation implementer 168 is omitted.

In some aspects, the input 166 is fed first into the noise reducer 170 prior to the de-reverberation implementer 168. In various aspects, the noise reducer 170 uses adaptive filtering. In one or more aspects, the noise reducer 170 uses neural networks to implement noise reduction of the multi-directional audio signals of the input 166. In some aspects, the noise reducer 170 is omitted.

In one or more aspects, the AGC 172 is a closed-loop circuit in one or more amplifiers that maintains a constant output signal after amplification. Therefore, the output 174 will have a suitable signal amplitude due to the AGC 172, in various aspects. In some aspects, the AGC 172 is omitted.

In one or more aspects, additional audio enhancement techniques are included but not limited to using a low pass filter, a high pass filter, linear filters, non-linear filters such as a median filter, least means square error, recursive least square, Fourier transforms, wavelet transforms, weighting, and other audio enhancement techniques.

Figure 5:
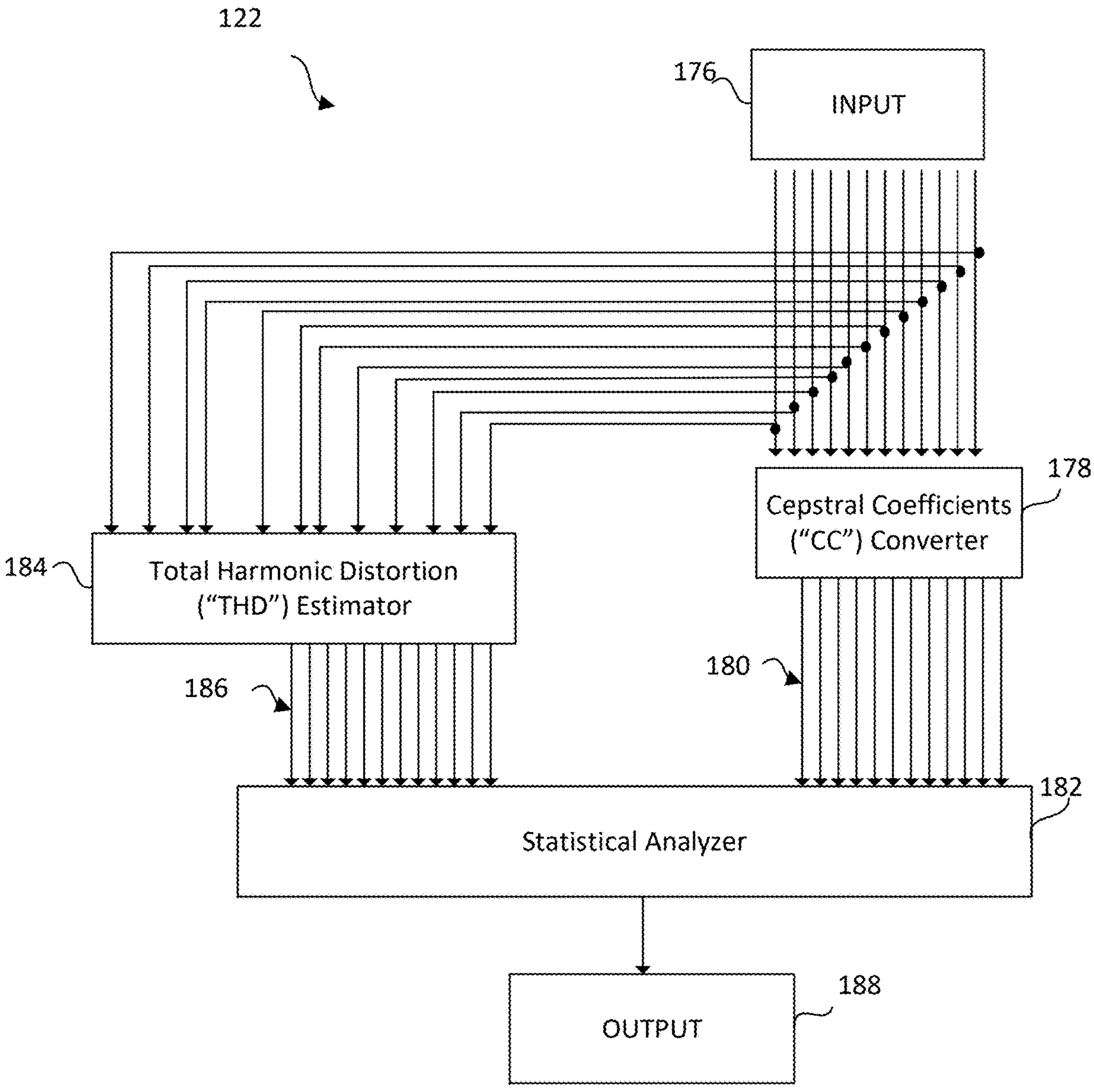
FIG. 5 is a simplified block diagram of a loudspeaker and media detector module including an example statistical analyzer in accordance with one or more aspects.

Referring to FIG. 5, with continuing reference to FIG. 2, FIG. 5 is an illustration of the loudspeaker and media detector module 122, in accordance with one or more instances. The loudspeaker and media detector module 122 receives an input 176. The loudspeaker and media detector module 122 includes a Cepstral coefficients ("CC") converter 178 that generates a CC matrix 180. The loudspeaker and media detector module also includes a statistical analyzer 182, and a total harmonic distortion ("THD") Estimator 184. The THD Estimator generates a THD array 186. The statistical analyzer 182 generates an output 188 based on the CC matrix 180 and/or the THD array 186. The CC converter 178 and the THD Estimator 184 are both in communication with and/or operably coupled to the statistical analyzer 182. The CC converter 178 sends the CC matrix 180 to the statistical analyzer 182. The THD estimator 184 sends the THD array 186 to the statistical analyzer.

In some aspects, the input 176 is the output 174. In one or more aspects, the input 176 are enhanced multi-directional audio signals. In various aspects, the input 176 is a multi-beam matrix. In several aspects, the input 176 is sent to both the THD estimator 184 and the CC converter 178.

In various aspects, the CC converter 178 uses CC, or cepstrum coefficients, to generate the CC matrix 180. In one or more aspects, the CC are defined by applying a Fast Fourier Transform ("FFT") over a period of time, then taking the power spectrum of the FFT, and then applying a discrete cosine transform over the power spectra of the FFT. In some instances, to find the CC, an analysis window is applied to the signal, next a time-frequency transform is then applied, then a logarithm of the absolute value is taken, and finally a second time-frequency transform is applied. In some aspects, the CC converter 178 is replaced with a Mel-Frequency Cepstrum Coefficients ("MFCC") Converter. The MFCC Converter uses MFCC to generate a MFCC matrix. In one or more aspects, the MFCC Converter is used in addition to the CC converter 178. In one or more aspects, the CC converter 178 is replaced and/or supplemented with one or more of: an Equivalent Rectangular Bandwidth ("ERB") Coefficients Converter, a Bark Scale Coefficients Converter, or a Fourier Transform Coefficient Converter. The ERB Coefficients Converter uses ERB Coefficients to generate an ERB Coefficients matrix. The Bark Scale Coefficients Converter uses Bark Scale Coefficients to generate a Bark Scale Coefficients Matrix. The Fourier Transform Coefficients Converter uses the Fourier Transform Coefficients to generate a Fourier Transform Coefficient Matrix.

In some aspects, the CC matrix 180 includes a CC per signal of the input 176.

In several aspects, the statistical analyzer 182 includes a support vector machine ("SVM") and uses pre-trained kernels to analyze features in the audio signals (such as the CC in the CC matrix 180). In one or more aspects, the statistical analyzer 182 includes a neural network that includes pre-trained weights to analyze features in the audio signals (such as THD of the THD array 186).

In one or more instances, the THD estimator 184 is omitted. In one or more instances, the THD estimator 184 and/or the CC converter 178 is replaced with Fourier Transform Signal-to-Noise Ratio ("SNR") Generator which outputs an SNR value of the individual signals of the input 176 per direction. In other aspects, the Fourier Transform SNR Generator is additionally included in the loudspeaker and media detector module 122.

In several aspects, the THD array 186 represents a measurement of the harmonic distortion that is present in each signal per direction. In various aspects, the THD array 186 includes a THD for each signal of the input 176.

In some aspects, the loudspeaker and media detector module 122 also includes the signal gate switch 124. In other aspects, the loudspeaker and media detector module 122 is in communication with and/or operably coupled to the signal gate switch 124.

Figure 6:
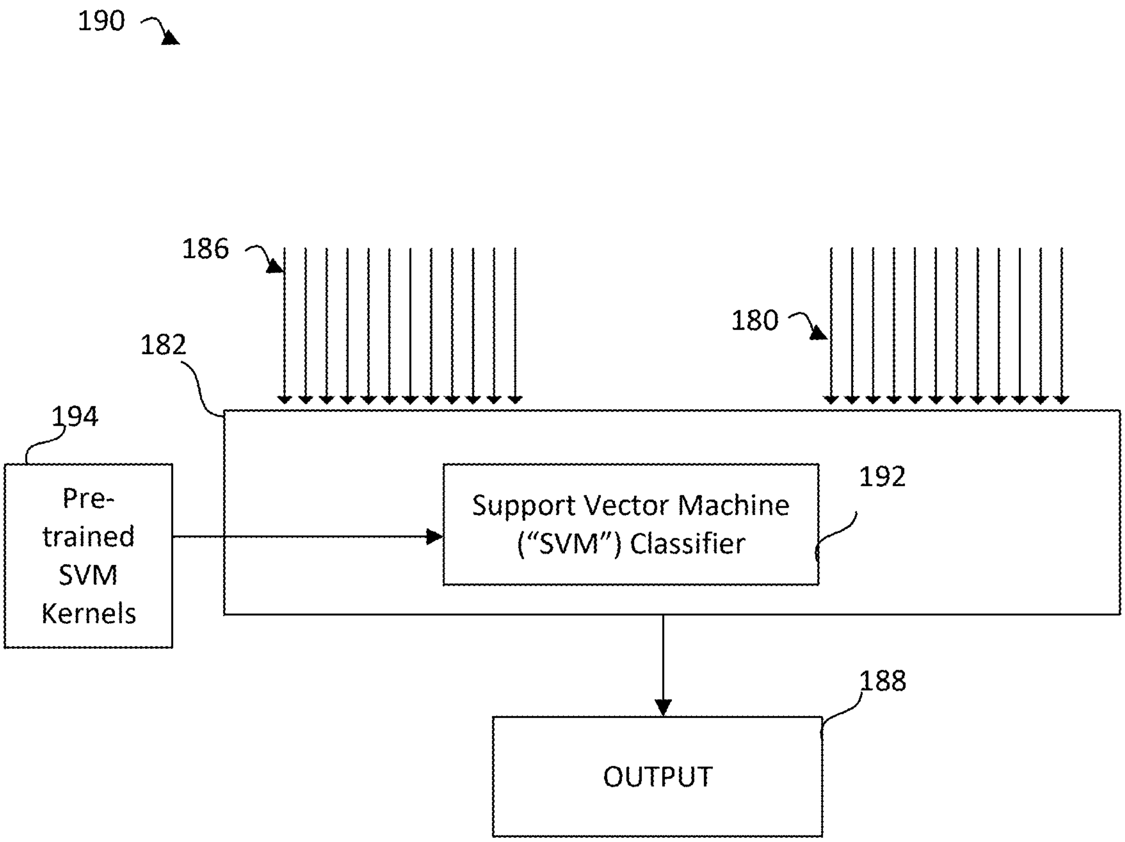
FIG. 6 is a simplified block diagram of a statistical analyzer in accordance with one or more aspects.

Referring to FIG. 6, with continuing reference to FIG. 5, FIG. 6 is an illustration of a portion of the loudspeaker and media detector module 122 of FIG. 5 generally referred to by reference numeral 190, in accordance with one or more instances. The portion 190 receives the CC matrix 180 and the THD array 186 in the statistical analyzer 182. The statistical analyzer 182 includes a SVM classifier 192. The SVM classifier 192 may call from a database a set of pre-trained SVM kernels 194. The SVM classifier 192 is a binary predictor. The SVM classifier 192 outputs a first prediction or a second prediction. The first prediction may correspond to: "yes, there is a media sound present," whereas the second prediction may correspond to: "no, there is not a media sound present." The statistical analyzer 182 may generate the output 188.

In some instances, the statistical analyzer 182 includes memory. In some instances, the SVM classifier 192 stores the predictions in memory. In one or more instances, the statistical analyzer 182 changes how often predictions are made. In some instances, rather than generating a new prediction, the SVM classifier 192 uses the prediction stored in the memory. In one or more aspects, the memory may be in the form of a neural architecture. In some aspects, the memory may be a Recurrent Neural Network ("RNN") such as a long-short term memory ("LSTM") or a transformer. In other aspects, instead of using a neural architecture, a deterministic output is used to determine how often the statistical analyzer 182 generates predictions as to whether the audio signal of the CC matrix 180 and/or the THD array 186 includes a media sound. In other aspects, the statistical analyzer is in communication with and/or operably coupled to the database. In several aspects, the pre-trained SVM kernels 194 are stored in the database.

In some aspects, the statistical analyzer 182 includes the signal gate switch 124. In one or more aspects, the SVM classifier 192 generates a prediction or an aggregate prediction that is output. In some aspects, when the SVM classifier 192 generates an output that indicates a media sound is present, then the signal gate switch 124 will send the respective audio signals as the output 188 for media identification by the media identification module 126. In other instances, the output 188 is the SVM classifier's prediction of whether a media sound is present in a sample of an audio signal.

In one or more instances, the SVM classifier 192 predicts on short-time samples. For example, in some aspects, one frame worth of CC. In other aspects, the SVM classifier 192 predicts using longer time samples, where the length of time is, for example, fifteen seconds, twenty seconds, or thirty seconds. In one or more aspects, the SVM classifier 192 may predict a plurality of the linear predictions for an audio signal. In some instances, an aggregate of the plurality of linear predictions is calculated and generated. For example, for the last one hundred samples, the SVM classifier 192 predicted no, ten times and yes, ninety times, and therefore, the SVM classifier 192 will output this signal as containing media. In some instances, a threshold value or confidence level is used to determine if the aggregate satisfies being classified as containing a media sound.

Figure 7:
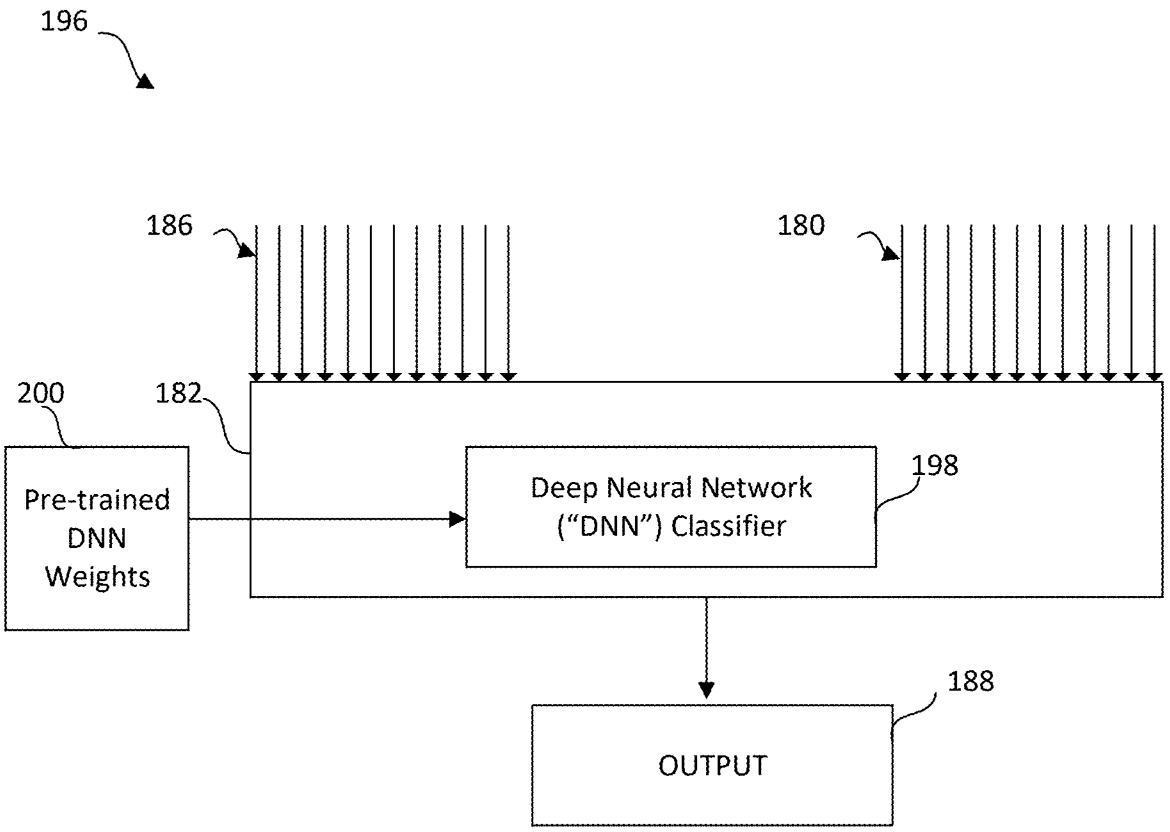
FIG. 7 is another simplified block diagram of a statistical analyzer of in accordance with one or more aspects.

Referring to FIG. 7, with continuing reference to FIG. 5, FIG. 7 is another illustration of a portion of the loudspeaker and media detector module 122 of FIG. 5 generally referred to by reference numeral 196, in accordance with one or more instances. The other portion 196 receives the CC matrix 180 and the THD array 186 at the statistical analyzer 182. The statistical analyzer 182 includes a deep neural network ("DNN") classifier 198. The DNN classifier 198 may call from a database a set of pre-trained DNN weights 200. The statistical analyzer 182 generates the output 188.

In some instances, the statistical analyzer 182 includes a database. In other aspects, the statistical analyzer is in communication with and/or operably coupled to the database. In several aspects, the pre-trained DNN weights 200 are stored in the database. In some instances, the statistical analyzer 182 includes memory. In one or more aspects, the memory may be in the form of a neural architecture. In some aspects, the memory may be a Recurrent Neural Network ("RNN") such as a long-short term memory ("LSTM") or a transformer. In other aspects, instead of using a neural architecture, a deterministic output is used to determine how often the statistical analyzer 182 generates predictions as to whether the audio signal of the CC matrix 180 and/or the THD array 186 includes a media sound.

In some aspects, the statistical analyzer 182 includes the signal gate switch 124. In one or more aspects, the DNN classifier 198 generates a prediction or an aggregate prediction that is output. In some aspects, when the DNN classifier 198 generates an output that indicates a media sound is present, then the signal gate switch 124 will send the respective audio signals as the output 188 for media identification by the media identification module 126. In other instances, the output 188 is the prediction of whether a media sound is present in a sample of an audio signal by the DNN classifier 198.

In one or more instances, the DNN classifier 198 predicts on short-time samples. For example, in some aspects, one frame worth of CC. In one or more aspects, the DNN classifier 198 may predict a plurality of the predictions for an audio signal. In some instances, an aggregate of the plurality of linear predictions is calculated and generated. In some instances, a threshold value or confidence level is used to determine if the prediction or the aggregate of predictions satisfies being classified as containing a media sound. For example, the DNN classifier 198 predicts with a greater than 75% chance that the audio signal includes media content.

In some aspects, the DNN classifier 198 determines whether the audio sound is coming from a stationary source or if the audio sound is coming from a moving source. An audio sound that is classified as moving by the DNN classifier 198 is predicted to not be a media sound, in some aspects.

Figure 8A:
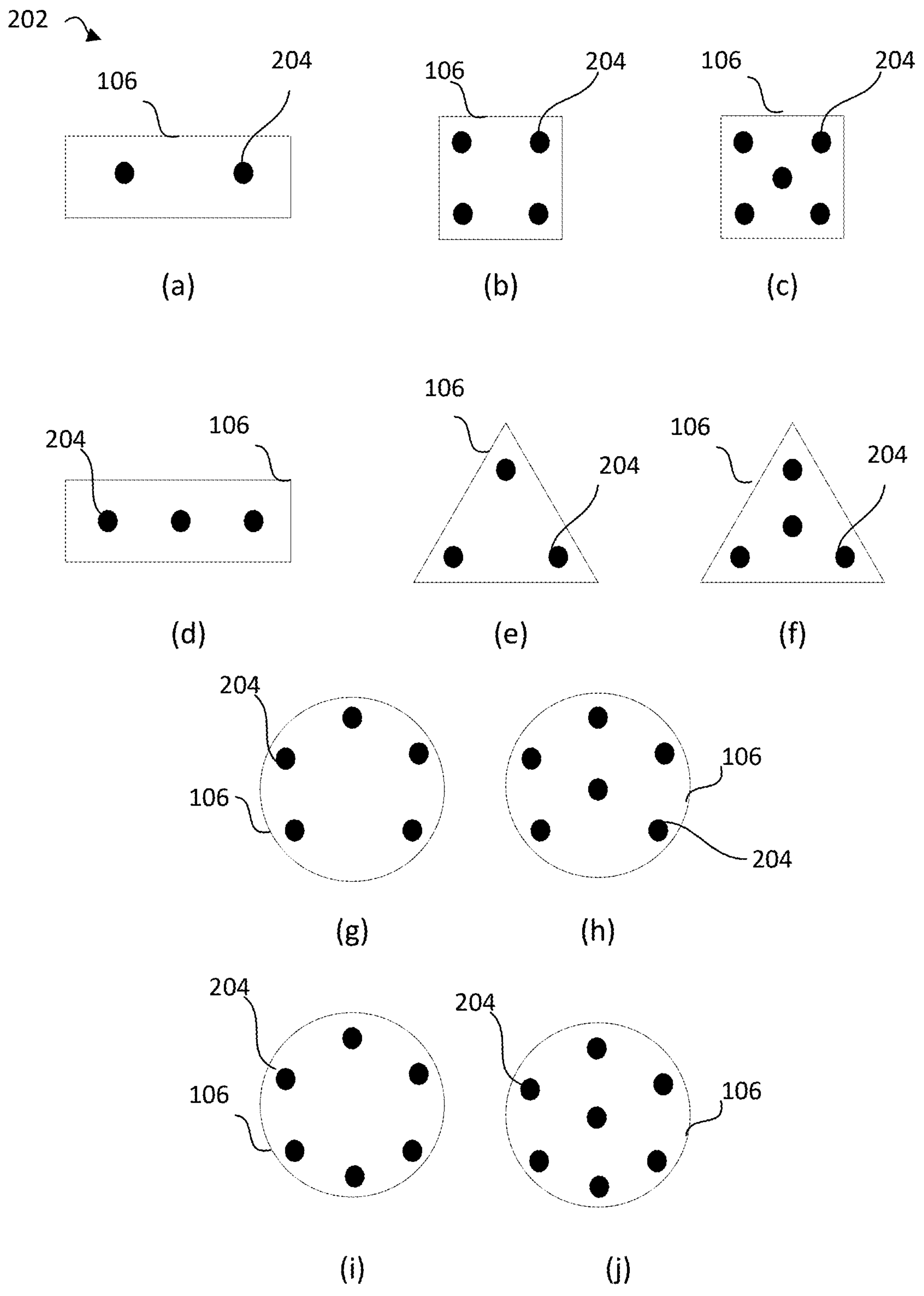
FIG. 8A is a simplified illustration of a set of configurations for a microphone array in accordance with one or more aspects.

Referring to FIG. 8A, FIG. 8A is a set of illustrations of various configurations of the microphone array 106 and is generally referred to by reference numeral 202, in accordance with various instances. The microphone array 106 may be in a variety of shapes and/or configurations, as shown in (a)-(j) of FIG. 8A. For example, the microphone array 106 may be a rectangular shape, a triangular shape, a square shape, or a circular shape. The microphone array 106 includes microphones 204. The microphones 204 of the microphone array 106 may be in a variety of configurations. The number of microphones 204 of the microphone array 106 may vary. In some instances, the microphone array 106 includes two microphones 204. In other instances, the microphone array 106 includes three or more microphones 204. For example, as shown in (j) of FIG. 8A, the microphone array 106 may include seven microphones 204. The microphone array 106 may be a two-dimensional array. All of the microphones 204 of the microphone array 106 may be equidistant from an origin. The central point may be the center of the microphone array 106. A microphone of the microphones 204 may have the same radius and/or distance from the remainder of the microphones 204 such that all microphones 204 are equidistant from the origin.

Figure 8B:
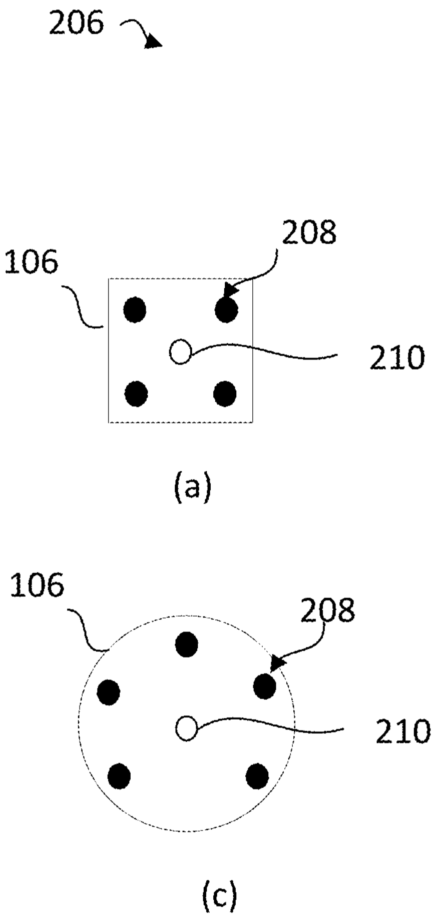
FIG. 8B is another simplified illustration of a set of configurations for a microphone array in accordance with one or more aspects.

Referring to FIG. 8B, FIG. 8B is a set of illustrations of various configurations of the microphone array 106 and is generally referred to by reference numeral 206, in accordance with various instances. The microphone array 106 may be in a variety of shapes and/or configurations, as shown in FIG. 8B. The microphone array 106 may be a three-dimensional array. The microphone array 106 includes perimeter microphones 208 that are equidistant from a central point of the microphone array 106 and a center microphone 210 disposed in the center of the microphone array 106. The center microphone 210 is raised in height in comparison to the perimeter microphones 208. In some instances, the center microphone 210 is raised in height at the same radius such that all of the microphones are equidistant from the origin.

III. Example Operations

The meter 104 and/or components thereof can be configured to perform and/or can perform one or more operations. Examples of these operations and related features will now be described.

Figure 9:
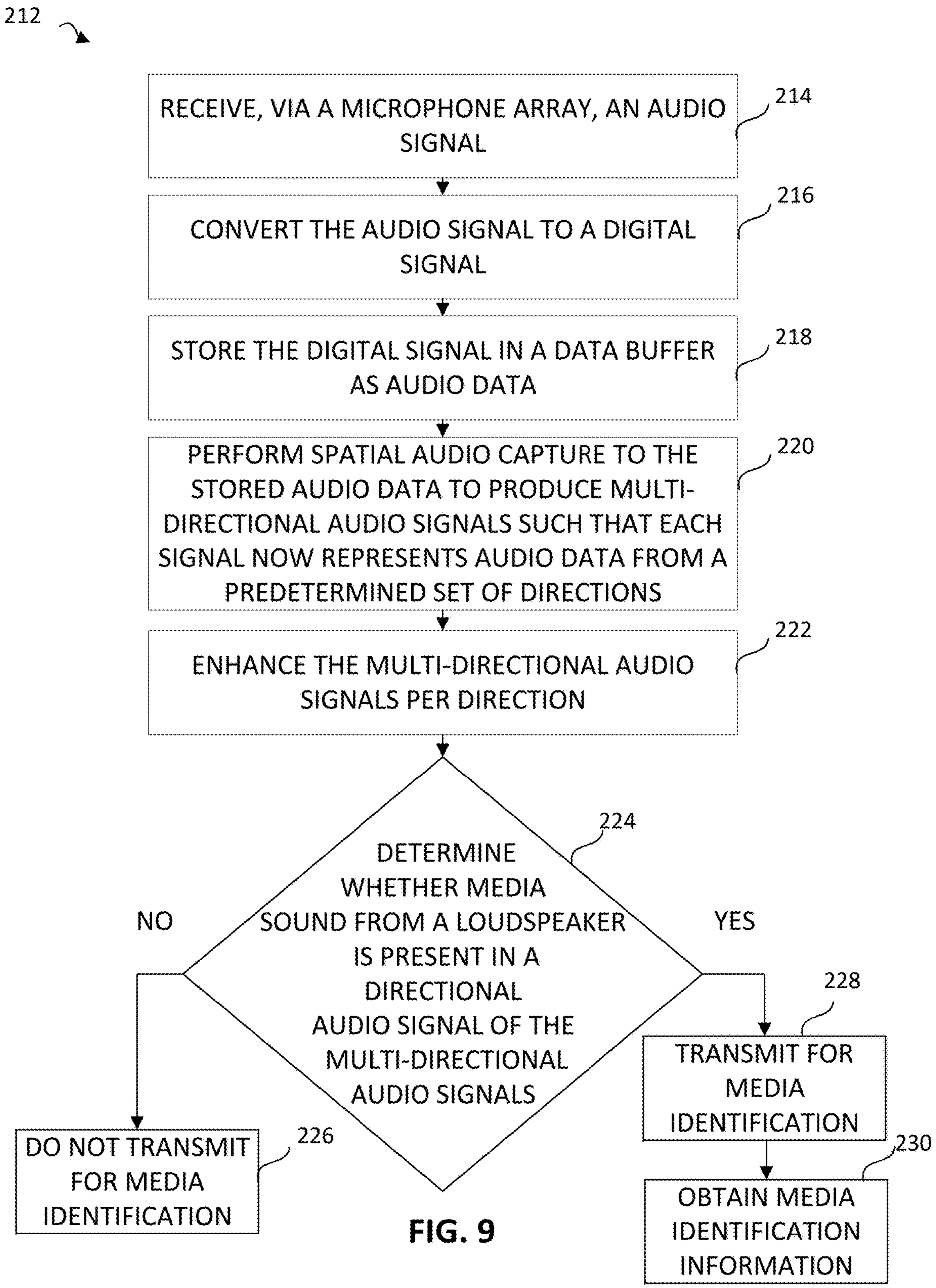
FIG. 9 is a flow chart of an example method for detecting a loudspeaker of a media device for media identification in accordance with one or more aspects.

Referring to FIG. 9, with continuing reference to FIGS. 1-8, a method 212 for detecting a loudspeaker of a media device for media identification according to one or more instances is described. Method 212 is illustrated as a set of operations or blocks 214 through 230. Not all of the illustrated blocks 214 through 230 may be performed in all aspects of method 212. One or more blocks that are not expressly illustrated in FIG. 9 may be included before, after, in between, or as part of the blocks 214 through 230. In some aspects, one or more of the blocks 214 through 230 may be implemented, at least in part, by the meter 104 or the sub-system 112 of the meter 104, in the form of executable code stored on non-transitory, tangible, machine-readable media that when run by one or more processors may cause the one or more processors to perform one or more of the processes. In one or more aspects, the blocks in method 212 are performed within a computing system, within the subsystem 112 of the meter 104 in FIG. 2, as described herein.

In an example aspect, the method 212 includes: receiving, via a microphone array, an audio signal at a block 214; converting the audio signal into a digital signal at a block 216; storing the digital signal in a data buffer as audio data at a block 218; performing spatial audio capture to the stored audio data to produce multi-directional audio signals such that each signal now represents audio data from a predetermined set of directions at a block 220; enhancing the multi-directional audio signals per direction at a block 222; determining whether media sound from a loudspeaker is present in a directional audio signal of the multi-directional audio signals at a block 224, if not present, then no transmitting for media identification at a block 226; if present, then transmitting for media identification at a block 228; and obtaining media identification information at a block 230.

In one or more aspects, the method 212 may be triggered at start-up of the meter 104 and/or the media device 102, after a set period of time, when the meter 104 is powered on, and the like. In some aspects, the meter 104 includes a tunable parameter for how often the method 212 is implemented.

In some aspects, the block 214 receives a plurality of audio signals. In one or more aspects, the block 214 uses the microphone array 106. In one or more aspects, the microphone array 106 captures an audio signal using two or more microphones. In some aspects, the microphones in the microphone array are placed and oriented in different configurations. In several instances, the microphones in the microphone array are configurable into various configurations as shown for example, in FIGS. 8A-8B. In some instances, the block 214 includes transmitting and/or sending the captured audio signal to the ADC 114 from each microphone in the microphone array 106 in a separate channel, where each audio signal represents the audio signal detected by a particular microphone.

In one or more aspects, the block 216 uses the ADC 114 to convert the audio signal into a digital signal or digital value. In various aspects, instead of using the ADC 114, the block 216 instead uses a PDM-PCM module. In several examples, block 216 includes the PDM-PCM Converter Module receiving the audio signal from the digital microphones of the microphone array 106 and converting the audio signal into a digital value or signal. In some aspects, the block 216 uses the ADC 114 when the microphone array 106 includes analog microphones. In some aspects, the digital signal or digital value is sent to a buffer for storage.

In some aspects, the block 218 stores the digital signal in the buffering module 116. In various instances, the buffering module 116 stores a digital value or a plurality of digital values transmitted from the PDM-PCM Converter module. In other instances, the buffering module 116 stores a digital value or a plurality of digital values transmitted from the ADC 114. In some instances, an additional block after the block 218 includes transmitting the stored audio data from the buffering module 116 to the spatial audio capture module 118. In other instances, other modules within the meter 104 request the stored audio data for audio processing.

In some aspects, the block 220 uses the spatial audio capture module 118. In some aspects, the block 220 includes requesting audio data from the buffer (such as buffering module 116). In various aspects, the block 220 generates multi-directional audio signals where each audio signal represents audio data from a different predetermined direction rather than each channel representing audio data from a particular microphone. In several aspects, the block 220 includes transmitting and/or sending the multi-directional audio signals to the audio enhancement module 120.

In some instances, the block 220 uses multi-directional beamforming to perform spatial audio capture, such as described in FIGS. 3A-3B. In one or more aspects, using the multi-directional beamforming includes computing time-delays for each direction based on the microphone configuration and the mic reference channel, which represents a specific channel in the buffered digital audio data. In other aspects, the multi-directional beamforming includes receiving previously computed time-delays stored in a database. In some aspects, the time delays and mic reference channel are sent to a delay and sum component (such as the second component 140 in FIG. 3B) to delay all the other channels and add them to the mic reference channel which results in a mono audio data representing sound from a direction, and then iterating through each mic reference channel to create a mono audio data representing data from each of the remaining directions. In several aspects, the block 220 generates mono audio data representing sound from a direction for each direction of a stored list of directions using the beamforming module 132. In other aspects, the block 220 generates mono audio data representing sound from a direction for each direction of a stored list of directions using beamforming or ambisonics (such as in FIG. 3C). In some aspects, the block 220 includes encoding the buffered audio data into ambisonic signals and then decoding to the list of directions. In several aspects, the block 220 includes encoding using a set of radial filters coefficients, whose parameters are pre-generated and stored, and converting the buffered audio data into ambisonic signals. In some aspects, the block 220 includes normalizing the ambisonics signals and passing these normalized ambisonics signals into a decoder. In one or more aspects, the block 220 includes decoding the normalized ambisonics signals using the list of directions to produce multi-directional audio signals.

In various instances, the block 222 includes enhancing a portion of the multi-directional audio signals. In some instances, the block 222 includes the audio enhancement module 120. A variety of operations and combinations of algorithms may be implemented at the block 222 to enhance the multi-directional audio signals of the input 166. In several aspects, the block 222 includes using one or more filters, implementing one or more weights, using an AGC 172 circuit, and the like. In one or more aspects, enhancing the multi-directional audio signals includes removing static noise such as a noise from an air conditioner running in the background of the media exposure environment 100, wall reflections, and reverberations, boosting the signal, and the like. In several aspects, the noise reducer 170 removes background noise such as appliance sounds that are interfering with the multi-directional audio signals. In various aspects, the block 222 includes receiving the input by the de-reverberation implementer 168 to remove the reverberations (which are caused by sound reflections in a room, such as from the media exposure environment 100) from the input 166. In several aspects, once the reverberations have been removed, the multi-directional audio signals may be sent to the noise reducer 170 to reduce the noise of the multi-directional audio signals to extract the desired information from the respective multi-directional audio signal. In some aspects, after the noise reduction, the AGC 172 may boost the signals of the multi-directional audio signals. In one or more aspects, one signal of the multi-directional audio signals is processed through the audio enhancement module 120 at a time, until all the multi-directional audio signals are processed or enhanced. In some aspects, the block 222 succeeds the block 220. In several aspects, the block 222 is omitted. In one or more aspects, the block 222 includes receiving the multi-directional audio signals from the spatial audio capture module 118. In some aspects, the enhanced multi-directional audio signals are sent to the loudspeaker and media detector module 122 at the block 226.

In several aspects, the block 224 is implemented by the loudspeaker and media detector module 122. In some aspects, the loudspeaker and media detector module 122 is a portion of a computing system of the meter 104. In one or more aspects, the block 224 is bypassed if the loudspeaker and media detector module 122 recently determined which of the directional audio signals included media sound from the media device 102. In several aspects, the block 224 includes a parameter for how often the block 224 is implemented. In some aspects, the parameter is a tunable parameter. In several aspects, the block 224 and/or the method 212 occurs often enough to detect a media sound from multiple media devices, including when multiple media devices are playing simultaneously. In some aspects, the block 224 determines whether each directional audio signal of the multi-directional audio signals includes a sound from a loudspeaker of a media device (such as the media device 102). In one or more aspects, the block 224 determines whether a portion of a directional audio signal of the multi-directional audio signals includes a media sound from a loudspeaker. In other aspects, at the block 224, the loudspeaker and media detector module 122 determines which directional audio signal of the multi-directional audio signals include a media sound from a loudspeaker. In several aspects, the block 224 determines which directional audio signal of the multi-directional audio signals includes the strongest signal and/or greatest likelihood of having a media sound from a loudspeaker. In some aspects, the block 224 determines whether a media sound from a loudspeaker is present in a stream of a directional audio signal. In some aspects, the block 224 determines whether the directional signal includes a sound from a loudspeaker of a media device by weighting a set of factors. For example, a stationary audio sound may be weighted greater than an audio sound that is moving, which may indicate a person is speaking, and a sound that appears to have audio characteristics and artifacts of sound from a loudspeaker will be weighted greater than sounds not having those audio characteristics. The determination, in some aspects, is not based on the volume (i.e., the loudest sound does not mean the directional audio signal includes a media sound from the loudspeaker of the media device).

In one or more aspects, the block 224 makes the determination by decoding in all directions rather than using a classifier such as the SVM classifier 192. For example, each channel may be decoded, and the channel with the strongest code may be sent to the block 228. In some instances, the strongest code is determined based on a SNR value of each channel. In one or more instances, multiple channels have a strong code such as an SNR value indicating that multiple media devices are in use in the media exposure environment 100. Each channel with a strong code is sent to the block 228 for media identification.

In some instances, the block 224 determines whether the audio signal is moving direction over time, which indicates a live sound rather than a media sound. In some instances, the meter 104 classifies the media exposure environment 100 into different zones with respect to the meter 104, such as 60-degree zones. For example, if the first person 108 is walking in the media exposure environment 100 while talking on the phone, the first person 108 passes through multiple zones. The block 224 may determine, based on the audio signals in each zone over time, that the sound of the first person 108 talking is a live sound rather than a media sound, and proceed to the block 226.

In some aspects, the block 224 makes the determination using the CC converter 178, the THD estimator 184, the Fourier Transform SNR estimator, and/or a statistical analyzer 182. For example, at the block 224, in several instances, the CC matrix 180 and/or the THD array 186 is fed into the statistical analyzer 182 in order to determine whether the audio signals represented in the indices of the array(s) represent sound from a loudspeaker of a media device, rather than determining the loudest sound. In some instances, the SVM classifier 192 or the DNN classifier 198 is used by the statistical analyzer 182. In various instances, sets of pre-trained SVM kernels 194 are trained and stored in a database that is accessible by the SVM classifier 192 at the block 214. The pre-trained SVM kernels 194 may be trained based on the similarities of features of the audio signal such as CC and THD. In some instances, at the block 224, the SVM classifier 192 analyzes an index representing a signal from the CC matrix 180 and/or the THD array 186 using the pre-trained SVM Kernels 194 and then loops through the analysis with the remainder of the indices to generate the output 188. In some instances, a set of pre-trained DNN weights 200 are trained and stored in a database that is accessible by the DNN classifier 198 at the block 224. The pre-trained DNN weights 200 may be trained based on features of the audio signal such as CC and THD. In some instances, the DNN classifier 198 analyzes an index representing a signal from the CC matrix 180 and/or the THD array 186 using the pre-trained DNN weights 200 and then loops through the analysis of the remainder indices to generate the output 188 at the block 224.

In various aspects, the block 224 identifies loudspeaker features that can be extracted from the loudspeakers of a media device. In some aspects, these loudspeaker features may include harmonic distortion produced by low-quality loudspeakers, which is estimated by the THD estimator 184, or similar artifacts and/or features generated by audio from loudspeakers. In several aspects, these features may be calculated and then statistically analyzed to predict whether to classify each directional audio signal of the multi-directional audio signals as being from the media device such as media device 102. In some aspects, the THD estimator 184 generates, at the block 224, a value per directional audio signal, where a lower value represents a better sound quality than a high value, as a value of zero represents no distortion from the enhanced directional audio signal.

In various aspects, the block 226 includes preventing transmission of one or more directional audio signals of the multi-directional audio signals, based on the determination that the media sound from a loudspeaker is not present. In some aspects, the block 226 includes using the signal gate switch 124 to prevent transmission. In one or more instances, the block 226 includes deleting one or more directional audio signals.

In some aspects, the block 228 includes passing one or more directional signal(s) through the signal gate switch 124 when the determination is made that media sound from a loudspeaker is present. In some aspects, at the block 228, if a directional audio signal is classified as a media sound, then an index of the directional signal is stored in a memory that is read by the signal gate switch 124 to allow that specific signal to be passed to the media identification module 126. In some aspects, the block 228 includes the signal gate switch 124 determining what audio data and/or signals gets sent to the media identification module 126 for media identification. In some aspects, the block 228 includes transmitting, via a network, the signature and/or the watermark decoding to a server in order to match to a reference. In some aspects, the server is operated by the AME.

In several instances, the block 230 includes watermark decoding. In some aspects, watermark decoding is done using the media identification module 126. In some instances, the block 220 decodes, using the media identification module 126, the watermark embedded in the audio information captured by the microphone array 106. In one or more aspects, at the block 230, a server identifies the media using the watermark. In some aspects, the block 230, includes using the obtained media identification information to identify the media.

In several aspects, the block 230 includes signature generation. In one or more aspects, the sub-system of a meter 104 extracts audio information associated with a program currently being broadcast and/or viewed by the media device 102 and processes that extracted information to generate audio signatures. In several aspects, the processing of the extracted information to generate audio signatures occurs at the media identification module 126. The audio signatures may include digital sequences or codes, (such as, but not limited to, StreamFP™), that, at a given instant of time, are substantially unique to each portion of audio content or program. In several examples, the audio information detected by the microphone array 106 are audio snippets with durations of six seconds or shorter. In other instances, the audio information may be 6, 8, or 10 second audio clips or the like. In some aspects, the signature and/or the watermark decoding is sent to a server in order to match to a reference. In this manner, an unidentified video or audio program (such as a radio program) can be reliably identified by finding a matching signature within a database or library containing the signatures of known available programs. When a matching signature is found, the previously unidentified audio content (e.g., television program, advertisement, etc.) is identified as the one of the known available programs corresponding to the matching database signature. In some aspects, signature matching occurs at the meter 104. In other instances, signature matching occurs using a server.

In various aspects, both watermark decoding and signature generation occur at the media identification module 126 at the block 230.

In various instances, the block 230 includes identifying a previously unidentified video or audio program (such as a radio program) by finding a matching signature within a database or library containing the signatures of known available programs. When a matching signature is found, the previously unidentified audio content (e.g., television program, advertisement, etc.) is identified as the one of the known available programs corresponding to the matching database signature. In some instances, once the media is identified, the information is output as part of media ratings used by an audience measurement entity. In one or more aspects, the block 230 occurs in part within the meter 104.

In several aspects, the method 212 may include crediting the media (at the server), as having been watched by one or more panelist(s) and incorporated in the media ratings.

Figure 10:
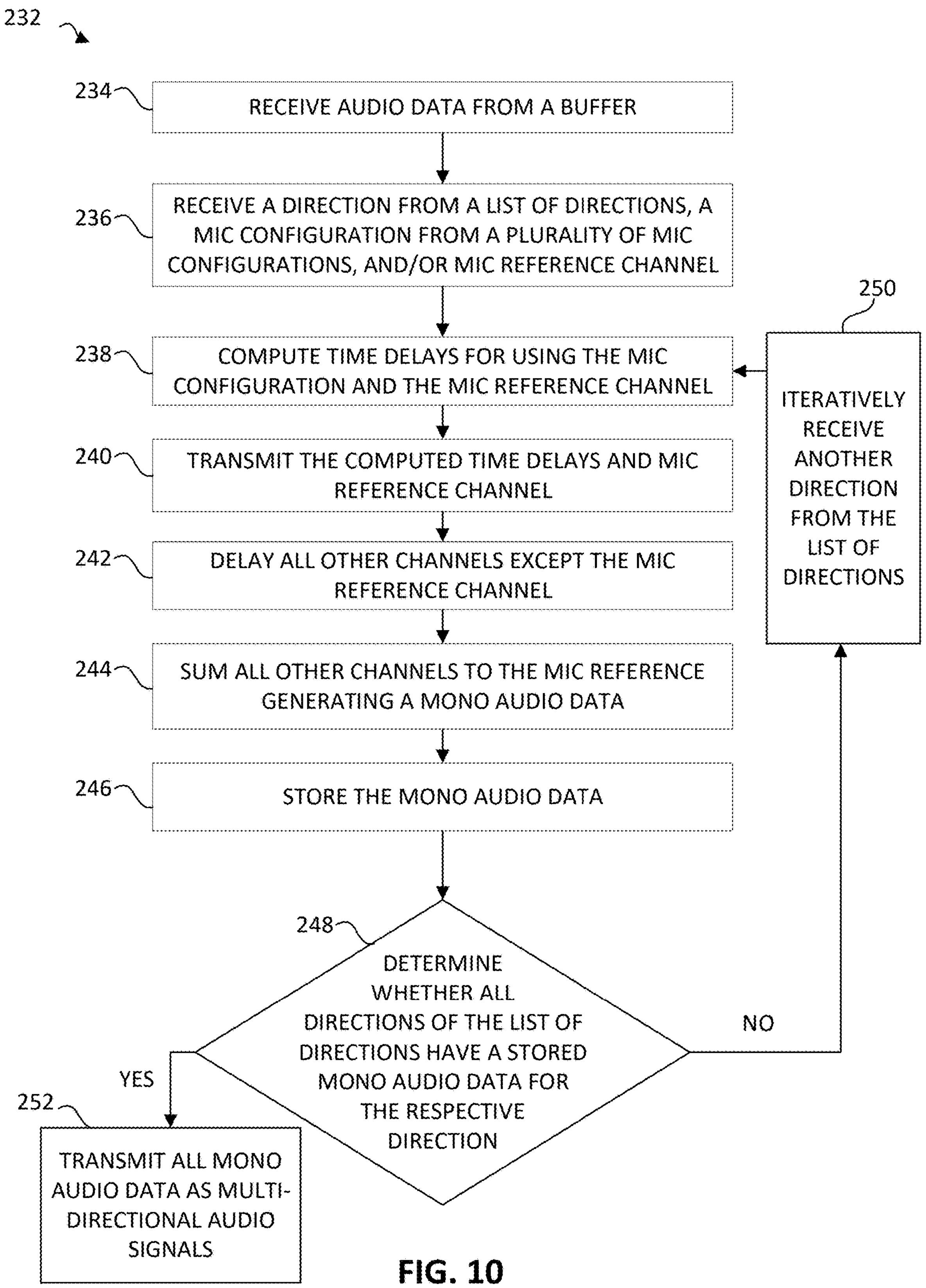
FIG. 10 is a flow chart of an example method for multi-directional beamforming in accordance with one or more aspects.

Referring now to FIG. 10, with continuing reference to at least FIGS. 3A-3B, a method 232 for multi-directional beamforming according to one or more instances is described. Method 232 is illustrated as a set of operations or blocks 234 through 252. Not all of the illustrated blocks 234 through 252 may be performed in all aspects of method 232. One or more blocks that are not expressly illustrated in FIG. 10 may be included before, after, in between, or as part of the blocks 234 through 252. In some aspects, one or more of the blocks 234 through 252 may be implemented, at least in part, by the meter 104 or the spatial audio capture module of sub-system 112, in the form of executable code stored on non-transitory, tangible, machine-readable media that when run by one or more processors may cause the one or more processors to perform one or more of the processes. In one or more aspects, the blocks in method 232 are performed within a computing system, as described herein.

In an example aspect, the method 232 includes: receiving audio data from a buffer at a block 234; receiving a direction from a list of directions, a mic configuration from a plurality of mic configurations, and/or a mic reference channel at a block 236; computing time delays for using the mic configuration and the mic reference channel at a block 238; transmitting the computed time delay and the mic reference channel at a block 240; delaying all other channels of the mic reference channel at a block 242; summing the all other channels to the mic reference channel generating mono audio data at a block 244; storing the mono audio data at a block 246; determining whether all directions of the list of directions have a stored mono audio data for the respective direction at a block 248; if there is not mono audio data for each direction, then iteratively receiving another direction from the list of directions at a block 250; and if there is mono audio data for each direction, transmitting all mono audio data as multi-directional audio signals at a block 252.

In some aspects, the block 234 includes receiving audio data in the form of a digital value or a digital signal. In one or more aspects, the block 234 includes receiving data from the buffering module 116. In several instances, the block 234 includes receiving buffered audio data. In one or more aspects, the block 234 includes requesting the audio data to be sent from the buffer. In some aspects, the audio data of the block 234 is the input 128. In various aspects, the input 128 is transmitted from memory (such as from the buffering module 116) to be processed by the beamformer 130 to represent sound captured by a microphone array, such as the microphone array 106, spatially.

In one or more aspects, the block 236 includes receiving each of the direction, the mic configuration, and the mic reference channel. In one or more aspects, one or more of: the list of directions, the plurality of mic configurations, and the mic reference channel are stored in one or more database(s) accessible by the spatial audio capture module 118 (such as database 134). In one or more instances, the block 236 includes receiving one or more of: the list of directions, from the one or more database(s). In some instances, the mic reference channel 148 is a single mic reference index. In several instances, the direction of the list of directions is the list of directions 144. In one or more examples, the mic configuration from a plurality of mic configurations is the mic configurations 146. In some instances, only one mic configuration is stored for the microphone array 106. In one or more instances, the block 236 includes receiving the direction, the mic configuration, and the mic reference channel at the beamforming module 132. In other instances, the block 236 includes receiving the direction, the mic configuration, and the mic reference channel at the first component 138 and/or the second component 140. In some aspects, the block 236 includes receiving at least two of: the direction, the mic configuration, and the mic reference at varying times.

In some aspects, the block 238 is omitted. In several aspects, the time delays are computed at an earlier time and stored in a database retrievable by the spatial audio capture module 118. In one or more aspects, the block 238 proceeds to blocks 234 and/or 236 and is stored. In various aspects, computing time delays occur in the first component 138. For example, the block 238, in some instances, receives the input 128 at the first component 138 and computes time delays of the input 128 (received audio data). The first component 138 may also be in communication with the list of directions 144, the mic configuration 146, and/or the mic reference channel 148. The first component 138, therefore, computes time delays for the direction (of the list of directions 144) based on a mic configuration of the mic configurations 146 and a mic reference channel 148. In other instances, computing time delays occur in the beamforming module 132. In some instances, computing time delays are based on the mic configuration and the mic reference channel. In one or more instances, time delays are computed for each direction.

In some instances, block 240 includes producing the output 136 that is sent to the second component 140, where the output 136 of the first component 138 includes the computed time delays and the mic reference channel. In one or more aspects, block 240 is omitted.

In various aspects, the block 242 includes delaying all other channels except the mic reference channel using the computed time delays. In some aspects, block 242 occurs in the beamforming module 132. In other aspects, the block 242 occurs within the second component 140.

In one or more aspects, the block 244 includes summing all other channels to the mic reference channel to generate a mono audio data, which represents sound from a direction. In some aspects, the direction being the direction received in the block 236. In several aspects, block 244 occurs in the beamforming module 132. In other aspects, the block 244 occurs within the second component 140.

In several aspects, the block 246 includes storing the mono audio data for a particular direction in a database. In some aspects, the mono audio data is stored in a matrix. In one or more aspects, the data is stored in the beamforming module 132, the database 134, or the third component 142.

In one or more aspects, the block 248 occurs within the beamformer 130 to determine whether all directions of the list of directions have a stored mono audio data for the respective directions. In some aspects, the block 248 only accounts for a subset of the list of directions.

In some aspects, if the determination is made that not all directions have a stored mono audio data, then the operation proceeds to the block 250. In one or more aspects, at the block 250, another direction is selected from the list of directions and the operation repeats at the block 238. In some instances, the block 250 selects another direction and then proceeds to block 242.

In one or more aspects, if the determination is made that all directions have respectively stored mono audio data, then the operation proceeds to block 252. In some aspects, all of the mono audio data is transmitted to the audio enhancement module 120 as multi-directional audio signals (e.g., output 136), where each directional signal represents a respective direction rather than a respective microphone. In some aspects, the mono audio data is sent to the audio enhancement module 120 prior to the block 248, rather than all the multi-directional audio signals being sent at one time.

Figure 11:
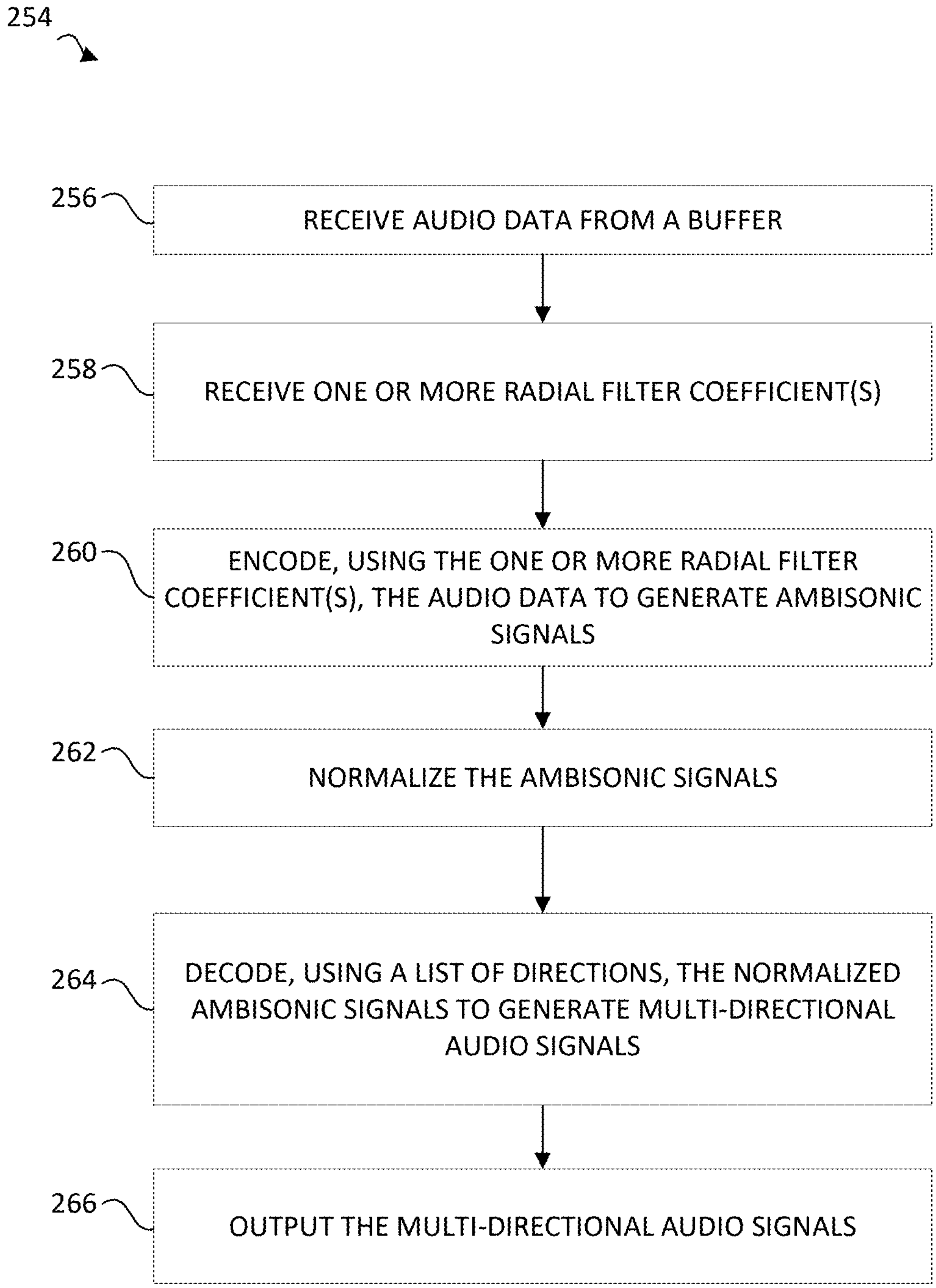
FIG. 11 is a flow chart of an example method for ambisonic spatial capture in accordance with one or more aspects.

Referring now to FIG. 11, with continuing reference to at least FIG. 3C, a method 254 for ambisonic spatial capture according to one or more instances. Method 254 is illustrated as a set of operations or blocks 256 through 266. Not all of the illustrated blocks 256 through 266 may be performed in all aspects of method 254. One or more blocks that are not expressly illustrated in FIG. 11 may be included before, after, in between, or as part of the blocks 256 through 266. In some aspects, one or more of the blocks 256 through 266 may be implemented, at least in part, by the meter 104 or the spatial audio capture module of sub-system 112, in the form of executable code stored on non-transitory, tangible, machine-readable media that when run by one or more processors may cause the one or more processors to perform one or more of the processes. In one or more aspects, the blocks in method 254 are performed within a computing system of a meter 104, as described herein.

In an example aspect, the method 255 includes: receiving audio data from a buffer at a block 256; receiving a one or more radial filter coefficient(s) at a block 258; encoding, using the one or more radial filter coefficient(s), the audio data to generate ambisonics signals at a block 260; normalizing the ambisonics signals at a block 262; decoding, using a list of directions, the normalized ambisonics signals to generate multi-directional audio signals at a block 264; and outputting the multi-directional audio signals at a block 266.

In some aspects, the block 256 includes receiving audio data in the form of a digital value or a digital signal. In one or more aspects, the block 256 includes receiving data from the buffering module 116. In several instances, the block 256 includes receiving buffered audio data. In one or more aspects, the block 256 includes requesting the audio data to be sent from the buffer. In some aspects, the audio data of the block 256 is the input 150. In various aspects, the input 150 is transmitted from memory (such as from the buffering module 116) to be processed by the ambisonic spatial capture generator 152 to represent sound captured by a microphone array, such as the microphone array 106, spatially.

In several aspects, the block 258 includes receiving a plurality of radial filters coefficients. In some aspects, the block 258 includes the radial filters coefficients 160. In some aspects, the block 258 includes receiving the radial filters coefficients stored in a database. In one or more aspects, the block 258 includes receiving the radial filter coefficients at an encoder or a radial filter such as the radial filter for ambisonic encoding 154.

In one or more aspects, the block 260 includes encoding, using the one or more radial filter coefficient(s), the audio data to generate ambisonic signals using an encoder or a radial filter such as the radial filter for ambisonic encoding 154.

In various instances, the block 262 includes normalizing the ambisonic signals using the normalization implementer 156. The block 262 occurs after the block 260, in some instances.

In one or more instances, the block 264 includes receiving the normalized ambisonic signals from the block 260. In various aspects, the block 264 includes using a decoder such as the decoder 158 and a list of directions 162 to decode the normalized ambisonic signals. In several aspects, the block 264 includes decoding the normalized ambisonic signal per direction of the list of directions. In some aspects, the block 264 occurs after 262. In several aspects, the block 264 includes storing the decoded multi-directional audio signals in a database.

In one or more aspects, the block 266 includes outputting the multi-directional audio signals which represent audio signals per direction. In some aspects, the block 266 outputs the output 164. In some aspects, the block 266 includes sending the multi-directional audio signals to the audio enhancement module 120.

IV. Example Computing Device

Any one or more of the above-described components, such as the meter 104, can take the form of a computing device, or a computing system that includes one or more computing devices.

Figure 12:
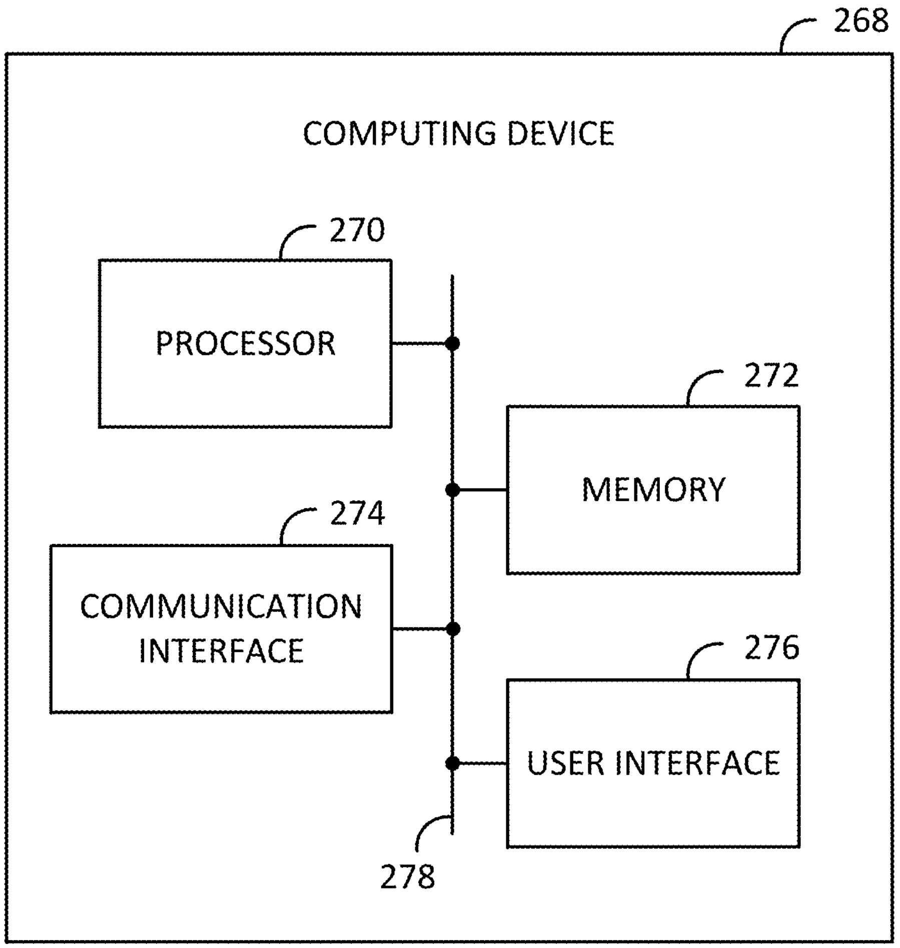
FIG. 12 is an illustrative node for implementing one or more example aspects of the present disclosure, according to an example aspect.

FIG. 12 is a simplified block diagram of an example computing device 268. The computing device 268 can be configured to perform one or more operations, such as the operations described in this disclosure. As shown, the computing device 268 can include various components, such as a processor 270, memory 272, a communication interface 274, and/or a user interface 276. These components can be connected to each other (or to another device, system, or other entity) via a connection mechanism 278.

The processor 270 can include one or more general-purpose processors and/or one or more special-purpose processors.

Memory 272 can include one or more volatile, non-volatile, removable, and/or non-removable storage components, such as magnetic, optical, or flash storage, and/or can be integrated in whole or in part with the processor 270. Further, memory 272 can take the form of a non-transitory computer-readable storage medium, having stored thereon computer-readable program instructions (e.g., compiled or non-compiled program logic and/or machine code) that, upon execution by the processor 270, cause the computing device 268 to perform one or more operations, such as those described in this disclosure. The program instructions can define and/or be part of a discrete software application. In some examples, the computing device 268 can execute the program instructions in response to receiving an input (e.g., via the communication interface 274 and/or the user interface 276). Memory 272 can also store other types of data, such as those types described in this disclosure. In some examples, memory 272 can be implemented using a single physical device, while in other examples, memory 272 can be implemented using two or more physical devices.

The communication interface 274 can include one or more wired interfaces (e.g., an Ethernet interface) or one or more wireless interfaces (e.g., a cellular interface, Wi-Fi interface, or Bluetooth® interface). Such interfaces allow the computing device 268 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 276 can facilitate interaction between computing device 268 and a user of computing device 268, if applicable. As such, the user interface 276 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 276 can include hardware and/or software components that facilitate interaction between the computing device 268 and the user of the computing device 268.

The connection mechanism 278 can be a cable, system bus, computer network connection, or other form of a wired or wireless connection between components of the computing device 268.

One or more of the components of the computing device 268 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 268 can be combined into a single component, and the function described herein for a single component can be subdivided among multiple components.

V. Example Variations

Although the examples and features described above have been described in connection with specific entities and specific operations, in some scenarios, there can be many instances of these entities and many instances of these operations being performed, perhaps contemporaneously or simultaneously, on a large-scale basis.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:

receiving, via a microphone array, an audio signal;

converting the audio signal to a digital signal;

storing the digital signal in a buffer as audio data;

performing spatial audio capture, using the stored audio data, to produce directional audio signals such that each signal now represents audio data from a respective direction;

and determining, for each directional audio signal, whether a media sound from a loudspeaker is present.

2. The method of claim 1, wherein performing spatial audio capture comprises:

receiving, from the buffer, the audio data, wherein the audio data comprises a plurality of channels;

receiving, from at least one database, a direction from a list of directions, a microphone configuration, and a microphone reference channel, wherein the microphone reference channel corresponds to one channel of the plurality of channels;

delaying all channels of the plurality of channels except the microphone reference channel;

and summing all the delayed channels to the microphone reference channel to generate mono audio data for the direction.

3. The method of claim 2, wherein performing spatial audio capture further comprises:

determining whether all directions in the list of directions have stored mono audio data for the respective directions; and transmitting, based on the determination that all directions have the stored mono audio data, the stored mono audio data as the directional audio signals.

4. The method of claim 1, further comprising:

enhancing the directional audio signals per direction; and storing, based on the determination that the media sound is present from the loudspeaker in a directional audio signal of the directional audio signals, an index for the directional audio signal.

5. The method of claim 4, further comprising:

passing, based on the index, the directional audio signal through a signal gate switch; and transmitting, after passing the directional audio signal through the signal gate switch, the directional audio signal to a server for media identification.

6. The method of claim 1, further comprising:

identifying, based on the determination that the media sound from the loudspeaker is present in a directional audio signal of the directional audio signals, media within the directional audio signal.

7. The method of claim 6, wherein identifying media comprises at least one of:

generating a signature using the directional audio signal; or decoding a watermark using the directional audio signal.

8. A non-transitory computer-readable storage medium, having stored thereon program instructions that, upon execution by a processor, cause performance of a set of operations comprising:

receiving, via a microphone array, an audio signal;

converting the audio signal to a digital signal;

storing the digital signal in a buffer as audio data;

performing spatial audio capture, using the stored audio data, to produce directional audio signals such that each signal now represents audio data from a respective direction;

and determining, for each directional audio signal, whether a media sound from a loudspeaker is present.

9. The non-transitory computer-readable storage medium of claim 8, wherein performing spatial audio capture comprises:

receiving, from the buffer, the audio data, wherein the audio data comprises a plurality of channels;

receiving, from at least one database, a direction from a list of directions, a microphone configuration, and a microphone reference channel, wherein the microphone reference channel corresponds to one channel of the plurality of channels;

delaying all channels of the plurality of channels except the microphone reference channel; and summing all the delayed channels to the microphone reference channel to generate mono audio data for the direction.

10. The non-transitory computer-readable storage medium of claim 9, wherein performing spatial audio capture further comprises:

determining whether all directions in the list of directions have stored mono audio data for the respective directions; and transmitting, based on the determination that all directions have the stored mono audio data, the stored mono audio data as the directional audio signals.

11. The non-transitory computer-readable storage medium of claim 8, the set of operations further comprising:

enhancing the directional audio signals per direction; and storing, based on the determination that the media sound is present from the loudspeaker in a directional audio signal of the directional audio signals, an index for the directional audio signal.

12. The non-transitory computer-readable storage medium of claim 11, the set of operations further comprising:

passing, based on the index, the directional audio signal through a signal gate switch; and transmitting, after passing the directional audio signal through the signal gate switch, the directional audio signal to a server for media identification.

13. The non-transitory computer-readable storage medium of claim 8, the set of operations further comprising:

identifying, based on the determination that the media sound from the loudspeaker is present in a directional audio signal of the directional audio signals, media within the directional audio signal.

14. The non-transitory computer-readable storage medium of claim 13, wherein identifying the media comprises at least one of: generating a signature using the directional audio signal; or decoding a watermark using the directional audio signal.

15. A computing system comprising:

a processor; and a non-transitory computer-readable storage medium, having stored thereon program instructions that, upon execution by the processor, cause performance of a set of operations comprising:

receiving, via a microphone array, an audio signal;

converting the audio signal to a digital signal;

storing the digital signal in a buffer as audio data;

performing spatial audio capture, using the stored audio data, to produce directional audio signals such that each signal now represents audio data from a respective direction;

and determining, for each directional audio signal, whether a media sound from a loudspeaker is present.

16. The computing system of claim 15, the set of operations further comprising:

identifying, based on the determination that the media sound from the loudspeaker is present in a directional audio signal of the directional audio signals, media, wherein identifying the media comprises at least one of: generating a signature using the directional audio signal; or decoding a watermark using the directional audio signal.

17. The computing system of claim 15, wherein the set of operations for performing spatial audio capture comprises:

receiving, from the buffer, the audio data, wherein the audio data comprises a plurality of channels;

receiving, from at least one database, a direction from a list of directions, a microphone configuration, and a microphone reference channel, wherein the microphone reference channel corresponds to one channel of the plurality of channels;

delaying all channels of the plurality of channels except the microphone reference channel; and summing all the delayed channels to the microphone reference channel to generate mono audio data for the direction.

18. The computing system of claim 17, wherein the set of operations for performing spatial audio capture further comprises:

determining whether all directions in the list of directions have stored mono audio data for the respective directions; and transmitting, based on the determination that all directions have the stored mono audio data, the stored mono audio data the directional audio signals.

19. The computing system of claim 15, the set of operations further comprising:

enhancing the directional audio signals per direction; and storing, based on the determination that the media sound is present from the loudspeaker in a directional audio signal of the directional audio signals, an index for the directional audio signal.

20. The computing system of claim 19, the set of operations further comprising:

passing, based on the index, the directional audio signal through a signal gate switch; and transmitting, after passing the directional audio signal through the signal gate switch, the directional audio signal to a server for media identification.

* * * * *